United States Patent
Konig et al.

(10) Patent No.: US 9,904,584 B2
(45) Date of Patent: Feb. 27, 2018

(54) PERFORMANCE ANOMALY DIAGNOSIS

(71) Applicant: Microsoft Technology Licensing, LLC, Redmond, WA (US)

(72) Inventors: Arnd Christian Konig, Kirkland, WA (US); Igor Dvorkin, Seattle, WA (US); Manish Kumar, Redmond, WA (US); Sudip Roy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 14/687,848

(22) Filed: Apr. 15, 2015

(65) Prior Publication Data

US 2016/0147585 A1    May 26, 2016

Related U.S. Application Data

(60) Provisional application No. 62/085,241, filed on Nov. 26, 2014.

(51) Int. Cl.
| | |
|---|---|
| *G06F 11/00* | (2006.01) |
| *G06F 11/07* | (2006.01) |
| *G06Q 10/00* | (2012.01) |
| *G06F 11/34* | (2006.01) |
| *G06F 11/32* | (2006.01) |

(52) U.S. Cl.
CPC ........ *G06F 11/079* (2013.01); *G06F 11/0709* (2013.01); *G06F 11/0751* (2013.01); *G06F 11/3419* (2013.01); *G06F 11/3452* (2013.01); *G06Q 10/00* (2013.01); *G06F 11/323* (2013.01); *G06F 11/3409* (2013.01); *G06F 11/3495* (2013.01)

(58) Field of Classification Search
CPC ............... G06F 11/079; G06F 11/0709; G06F 11/0751; G06F 11/3419; G06F 11/3452; G06F 11/323; G06F 11/3409; G06F 11/3495; G06F 11/3006; G06F 11/3055; G06Q 10/00
USPC ...................... 714/46, 26, 37, 47.1, 47.3, 57
See application file for complete search history.

(56) References Cited

U.S. PATENT DOCUMENTS

| | | | |
|---|---|---|---|
| 6,192,319 B1 * | 2/2001 | Simonson | G06Q 30/02 702/179 |
| 7,191,181 B2 | 3/2007 | Chaudhuri et al. | |
| 8,452,871 B2 | 5/2013 | Ge et al. | |
| 8,495,429 B2 * | 7/2013 | Fu | G06F 11/3608 714/25 |
| 2005/0038827 A1 | 2/2005 | Hooks | |
| 2007/0168696 A1 | 7/2007 | Ridel et al. | |

(Continued)

OTHER PUBLICATIONS

Ma et al., "Frugal Streaming for Estimating Quantiles", Proceedings of Space-Efficient Data Structures, Streams, and Algorithms, Aug. 15, 2013, 20 pages.

(Continued)

*Primary Examiner* — Joseph D Manoskey
(74) *Attorney, Agent, or Firm* — Rainier Patents, P.S.

(57) ABSTRACT

The described implementations relate to tunable predicate discovery. One implementation is manifest as a method for obtaining a data set and determining anomaly scores for anomalies of an attribute of interest in the data set. The method can also generate a ranked list of predicates based on the anomaly scores and cause at least one of the predicates of the ranked list to be presented.

20 Claims, 12 Drawing Sheets

(56) References Cited

U.S. PATENT DOCUMENTS

| | | | |
|---|---|---|---|
| 2008/0148180 | A1 | 6/2008 | Liu et al. |
| 2010/0014432 | A1 | 1/2010 | Durfee et al. |
| 2011/0078106 | A1 | 3/2011 | Luchi et al. |
| 2012/0173710 | A1 | 7/2012 | Rodriguez |
| 2012/0278477 | A1 | 11/2012 | Terrell et al. |
| 2013/0030761 | A1* | 1/2013 | Lakshminarayan . G06K 9/6219 702/179 |
| 2013/0211559 | A1 | 8/2013 | Lawson et al. |
| 2014/0040174 | A1* | 2/2014 | Leung ................. G06N 99/005 706/12 |
| 2014/0096249 | A1 | 4/2014 | Dupont et al. |
| 2014/0189086 | A1* | 7/2014 | Chattopadhyay ..... H04L 41/145 709/223 |

OTHER PUBLICATIONS

Manku et al., "Approximate Medians and other Quantiles in One Pass and with Limited Memory", Proceedings of the ACM SIGMOD international conference on Management of data, Jun. 1, 1998, 10 pages.

Atkinson et al., "Min-Max Heaps and Generalized Priority Queues", Proceedings of Communications of the ACM, vol. 29, Issue 10, Oct. 1, 1986, 5 pages.

Kullback, S. and R.A. Leibler, "On Information and Sufficiency", Proceedings of the Annals of Mathematical Statistics, vol. 22, No. 1, Mar. 1951, 9 pages.

Friedman, Jerome H., "Greedy Function Approximation: A Gradient Boosting Machine", Annals of Statistics, vol. 29, No. 5, Oct. 2001, 45 pages.

Breunig et al., "LOF: Identifying Density-Based Local Outliers", Proceedings of the ACM SIGMOD International Conference on Management of Data, May 16, 2000, 12 pages.

Mao, Ming and Marty Humphrey, "A Performance Study on the VM Startup Time in the Cloud", Proceedings of the IEEE Fifth International Conference on Cloud Computing, Jun. 24, 2012, 8 pages.

Roy et al., "PerfAugur: Robust Diagnostics for Performance Anomalies in Cloud Services," ICDE, 31st International Conference on Data Engineering, Apr. 15, 2015, 12 pages.

International Search Report and Written Opinion dated Mar. 14, 2016 from PCT Patent Application No. PCT/US2015/062048, 13 pages.

Response and Demand filed Apr. 20, 2016 to the International Search Report and Written Opinion dated Mar. 14, 2016 from PCT Patent Application No. PCT/US2015/062048, 13 pages.

Lou et al., "Mining Invariants from Console Logs for System Problem Detection", Proceedings of the USENIX conference on USENIX annual technical conference, Jun. 23, 2010, 14 pages.

Xu et al., "Detecting Large-Scale System Problems by Mining Console Logs", Proceedings of the ACM SIGOPS 22nd symposium on Operating systems principles, Oct. 11, 2009, 16 pages.

Cherkasova et al., "Anomaly? Application Change? or Workload Change?—Towards Automated Detection of Application Performance Anomaly and Change", Proceedings of 38th Annual IEEE International Conference on Dependable Systems and Networks, Jun. 24, 2008, 10 pages.

Ozkan et al., "Data Imputation through the Identification of Local Anomalies", Proceedings of IEEE Transactions on Neural Networks and Learning Systems, Retrieved on: Nov. 10, 2014, 14 pages.

Kamra et al., "Responding to Anomalous Database Requests", Proceedings of 5th Very Large Data Bases on Secure Data Management, Aug. 24, 2008, 17 pages.

Cohen et al., "Vayu: Learning to control the cloud", Proceedings of Workshop on Managing Systems Automatically and Dynamically, Oct. 7, 2012, 7 pages.

Tan et al., "Adaptive System Anomaly Prediction for Large-Scale Hosting Infrastructures", Proceedings of the 29th ACM SIGACT-SIGOPS symposium on Principles of distributed computing, Jul. 25, 2010, 10 pages.

Xu et al., "Online System Problem Detection by Mining Patterns of Console Logs", Proceedings of the IEEE International Conference on Data Mining, Dec. 6, 2009, 10 pages.

"WSARE", Published on Sep. 24, 2006, retrieved at <<http://www.autonlab.org/autonweb/16620.html>>on Nov. 12, 2014, 1 page.

Kavulya et al., "Draco: Statistical diagnosis of chronic problems in large distributed systems", Proceedings of 42nd Annual IEEE International Conference on Dependable Systems and Networks, Jun. 25, 2012, 2 pages.

Gabel et al., "Latent Fault Detection in Large Scale Services", Proceedings of 42nd Annual IEEE International Conference on Dependable Systems and Networks, Jun. 25, 2012, 12 pages.

Dean, Jeffrey and Luiz Andre Barroso, "The Tail at Scale", Communications of the ACM, vol. 56, Issue 2, Feb. 1, 2013, 7 pages.

Xu et al., "Bobtail: Avoiding Long Tails in the Cloud", Proceedings of the 10th USENIX conference on Networked Systems Design and Implementation, Apr. 2, 2013, 13 pages.

Alizadeh et al., "Less is More: Trading a Lithe Bandwidth for Ultra-Low Latency in the Data Center", Proceedings of be 9th USENIX conference on Networked Systems Design and Implementation, Apr. 25, 2012, 14 pages.

Zats et al., "DeTail: Reducing the Flow Completion Time Tail in Datacenter Networks", Proceedings of the ACM SIGCOMM conference on Applications, technologies, architectures, and protocols for computer communication, Aug. 13, 2012, 12 pages.

Nagaraj et al., "Structured Comparative Analysis of Systems Logs to Diagnose Performance problems", Proceedings of the 9th USENIX conference on Networked Systems Design and Implementation, Apr. 25, 2012, 14 pages.

Aggarwal, Charu C., "Outlier Analysis", Proceedings of Springer, Feb. 10, 2013, 97 pages.

Wu, Eugene and Samuel Madden, "Scorpion: Explaining Away Outliers in Aggregate Queries", Proceedings of the VLDB Endowment VLDB Endowment Hompage archive vol. 6, Issue 8, Aug. 26, 2013, 12 pages.

Chen et al., "Failure Diagnosis Using Decision Trees", Proceedings of the International Conference on Autonomic Computing, May 17, 2004, 8 pages.

Cohen, Ira and Jeffrey S. Chase, "Correlating instrumentation data to system states: A building block for automated diagnosis and control", Proceedings of the 6th Symposium on Operating Systems Design & Implementation, vol. 6, Dec. 6, 2004, 14 pages.

Duan et al., "Fa: A System for Automating Failure Diagnosis", Proceedings of the IEEE International Conference on Data Engineering, Mar. 29, 2009, 12 pages.

Bodik et al., "Fingerprinting the Datacenter: Automated Classification of Performance Crises", Proceedings of the 5th European conference on Computer Systems, Apr. 13, 2010, 14 pages.

Roy, Sudeepa and Dan Suciu, "A Formal Approach to Finding Explanations for Database Queries", Proceedings of the ACM SIGMOD international Conference on Management of Data, Jun. 22, 2014, 12 pages.

Micenkova, Barbora and Raymond T. Ng, "Explaining outliers by subspace separability", Proceedings of IEEE 13th International Conference on Data Mining, Dec. 7, 2013, 10 pages.

Muller et al., "Statistical Selection of Relevant Subspace Projections for Outlier Ranking", Proceedings of the IEEE 27th International Conference on Data Engineering, Apr. 11, 2011, 12 pages.

Rousseeuw, Peter J. and Annick M. Leroy, "Robust Regression and Outlier Detection", Proceedings of Wiley Series in Probability and Mathematical Statistics, Sep. 2003, 355 pages.

International Preliminary Report on Patentability dated Feb. 14, 2017 from PCT Patent Application No. PCT/US2015/062048, 8 Pages.

Second Written Opinion dated Nov. 14, 2016 from PCT Patent Application No. PCT/US2015/062048, 7 pages.

Communication pursuant to Rules 161(1) and 162 EPC dated Jul. 4, 2017 from European Patent Application No. 15805047.6, 2 pages.

Response filed Aug. 14, 2017 to the Communication pursuant to Rules 161(1) and 162 EPC dated Jul. 4, 2017 from European Patent Application No. 15805047.6, 13 pages.

* cited by examiner

PERFORMANCE ANOMALY DIAGNOSIS

BACKGROUND

Performance of complex systems can be difficult to manage, investigate, and/or improve. A cloud computing platform offering computational services is one example of a complex system. Customers of cloud computing platforms demand stringent performance and availability requirements. To be competitive, cloud computing platforms need to regularly improve their quality of service to meet customer demands. One aspect of improving the quality of service is based upon tracking various key performance indicators to quantify performance and availability. However, in the case of cloud computing platforms, a system can involve multiple independently developed components, often executing on diverse hardware configurations and across multiple data centers. This heterogeneity and system complexity can make tracking various key performance indicators and diagnosing of anomalies in system behavior both difficult and expensive. Tracking and diagnosis of anomalies in system behavior can be beneficial for management of a wide variety of complex systems and/or operations.

SUMMARY

The described implementations relate to tunable predicate discovery. One implementation is manifest as a method for obtaining a data set and determining anomaly scores for anomalies of an attribute of interest in the data set. The method can also generate a ranked list of predicates based on the anomaly scores and cause at least one of the predicates of the ranked list to be presented.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

Figure 1:
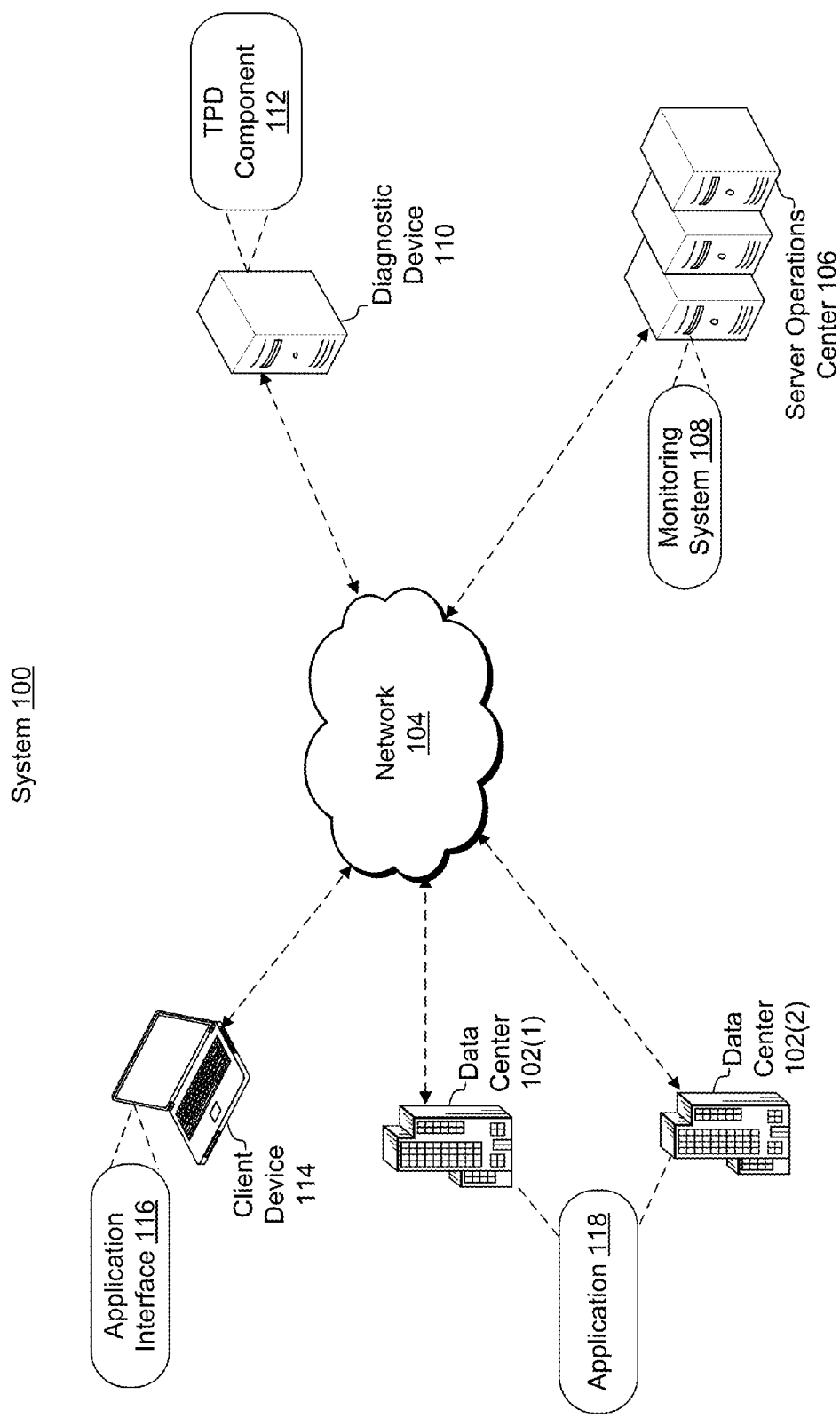
FIGS. 1 and 2 show exemplary systems in which the present concepts can be employed in accordance with some implementations.

This discussion relates to tunable predicate discovery. In the disclosed implementations tunable predicate discovery concepts can be implemented to discover predicates (e.g., conditions, constraints) that identify an anomalous subset of data. For example, tunable predicate discovery concepts can be used to diagnose anomalies in a complex system, such as a cloud computing platform that offers computational services. Additionally, a level (e.g., magnitude) of anomaly can be selected (e.g., tuned) for diagnosis.

Generally speaking, predicates are conditions and/or constraints under which an anomaly (e.g., change in behavior relative to a baseline) occurs. In some cases, anomalies may be subtle and/or difficult to recognize (e.g., latent faults). Additionally or alternatively, a system may be highly complex and/or contain heterogeneous components, potentially making anomaly diagnosis very difficult. In the disclosed implementations, tunable predicate discovery can efficiently and rapidly discover predicates that indicate anomalies. In some cases, tunable predicate discovery can discover potentially significant but hard to detect anomalies, even for highly complex systems. For example, tunable predicate discovery can answer questions such as: under which conditions does service become slower, are servers more likely to fail, are customers more likely to churn? Discovery of the predicates can allow more rapid and efficient diagnosis of the anomalies. Tunable predicate discovery can provide a readily actionable result for a system manager.

In the disclosed implementations, tunable predicate discovery may be applied to a data set from a system. The data set may include attributes and/or performance characteristics of the system. For example, the attributes of the system may include identification, location, and/or types of components in the system. In an example of a cloud services system, the performance characteristics might include time, latency, reliability, availability of components, hardware failure, software failure, return codes, etc. The performance characteristics can also be considered key performance indicators (KPIs). The data set from the system may also include anomalies (e.g., performance anomalies). The anomalies may be related to and/or evidenced in one or more of the attributes and/or the performance characteristics of the system.

In some implementations, tunable predicate discovery can be considered an automated system for mining service logs (e.g., cloud computing service logs) to identify anomalies. Tunable predicate discovery can include relatively efficient mining algorithms for detecting potentially significant anomalies in system behavior and/or performance. Tunable predicate discovery can also provide potential explanations for such anomalies, such as helping to formulate data-driven hypotheses as to the involved components and root causes. In the disclosed implementations, tunable predicate discovery may not rely on an explicit supervision signal for predicate discovery and/or anomaly detection. For example, a data set may not necessarily include failure data or a set of abnormal instances in a separate log. In the disclosed implementations, tunable predicate discovery can also be robust to outliers.

Furthermore, in the disclosed implementations, tunable predicate discovery can provide techniques to control computational overhead typically associated with robust statistics. For example, algorithms consistent with tunable predicate discovery concepts can address challenges that may be imposed by a size of a search space associated with a potentially complex system and the corresponding computational overhead.

Tunable Predicate Discovery Case Study

Figure 2:
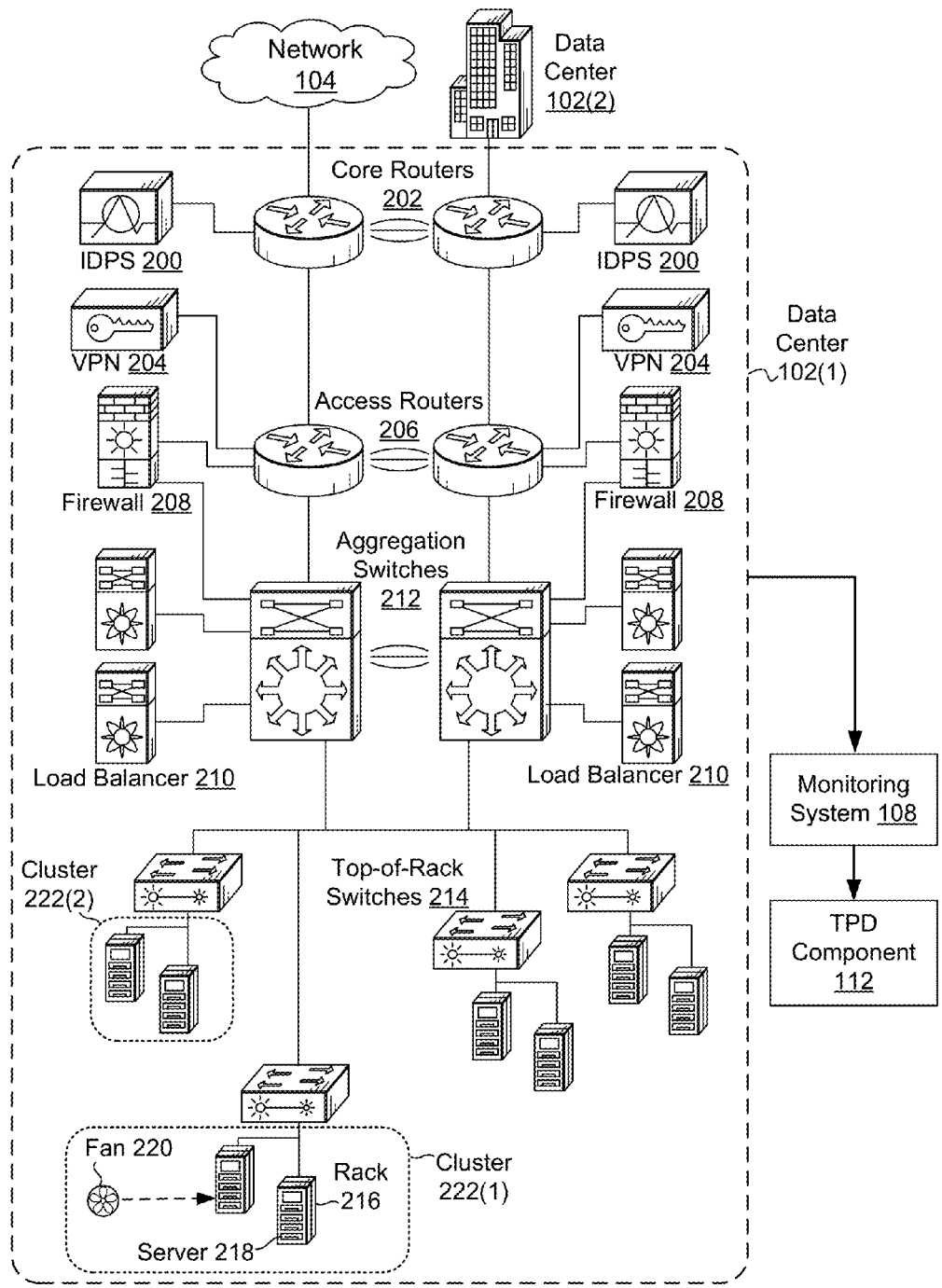
Figure 3:
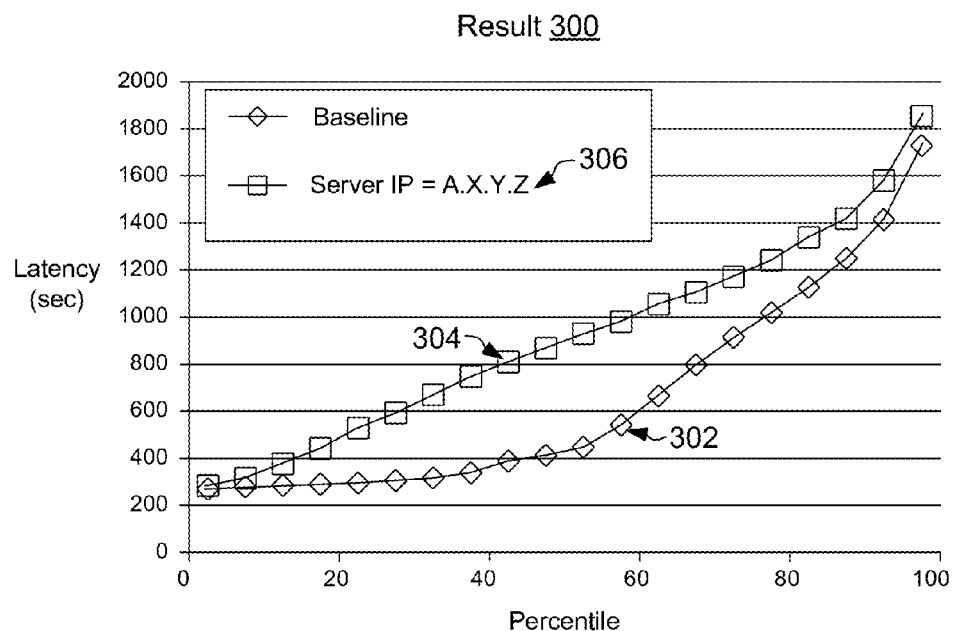
FIGS. 3 and 4 show example predicate discovery results in accordance with some implementations.
Figure 4:
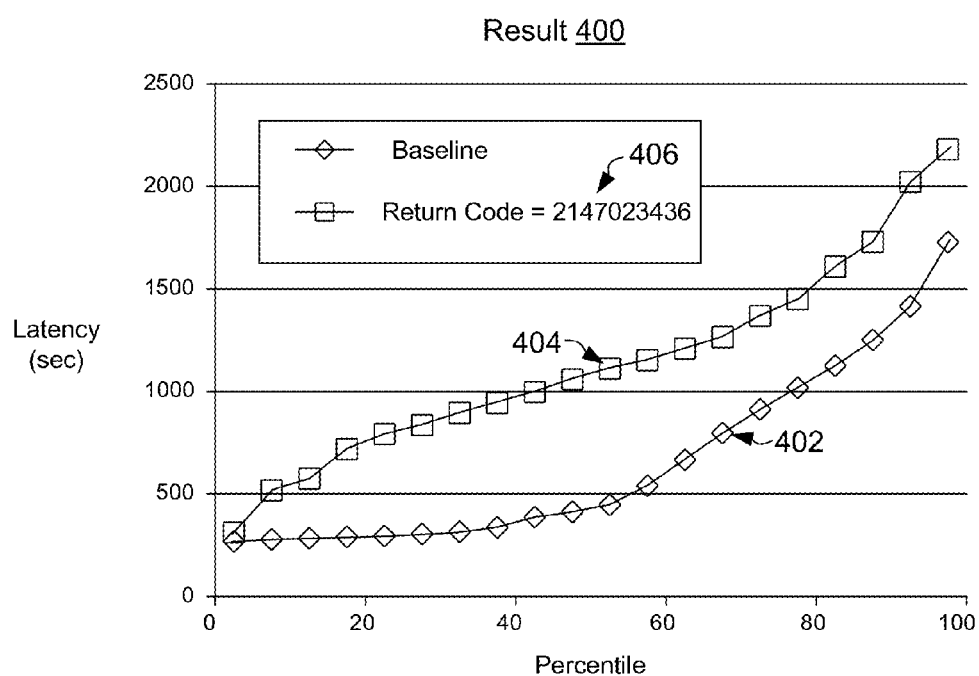

FIGS. 1-4 collectively illustrate an example of tunable predicate discovery. FIGS. 1-2 show an exemplary system 100 that is consistent with the disclosed implementations. FIGS. 3-4 show example results that can be obtained from applying tunable predicate discovery concepts to system 100.

As shown in FIG. 1, system 100 can be a cloud services system including a data center 102(1) and a data center 102(2). Note that different instances of drawing elements are distinguished by parenthetical references, e.g., 102(1) refers to a different data center than 102(2). When referring to multiple drawing elements collectively, the parenthetical will not be used, e.g., data centers 102 can refer to either or both of data center 102(1) or data center 102(2).

System 100 can also include a network 104 connecting numerous entities, including the data centers 102, a server operations center 106 having a monitoring system 108, a diagnostic device 110 having a tunable predicate discovery (TPD) component 112, and/or a client device 114 having an application interface 116.

Network 104 can include various wired and/or wireless networks and combinations thereof. For example, network 104 can include the public Internet as well as various private networks or portions thereof that connect any of the devices/data centers shown in FIG. 1. For the purposes of the following discussion, it is generally sufficient that network 104 provides connectivity between devices and/or data centers that share information.

In the example shown in FIG. 1, client device 114 can interact with an application 118 by communicating over network 104 with either data center 102(1) or data center 102(2). Application interface 116 can include logic for communicating with the application, e.g., formatting functionality, display functionality, etc. For example, client device 114 can be employed by an end user that wishes to use various features made available by the application. Example configurations of the data centers 102 will be discussed further relative to FIG. 2.

Server operations center 106 can generally include one or more server devices configured to monitor the individual data centers 102 for performance characteristics and/or network problems. Monitoring system 108 can monitor reliability of the system 100 as a whole and/or of individual components. For example, the monitoring system can execute on the server devices (FIG. 2) to monitor data centers 102(1) and 102(2). The monitoring system can also collect information in data sets, such as service logs.

FIG. 2 shows system 100 in closer detail, specifically showing an example data center network architecture for data center 102(1). In this case, data center 102(1) includes devices or components such as intrusion detection and prevention systems (IDPS) 200, core routers 202, virtual private networks (VPNs) 204, access routers 206, firewalls 208, load balancers 210, aggregation switches 212, Top-of-Rack (ToR) switches 214, and/or racks 216 of servers 218. System 100 may also include various other components, such as fans 220, which may be in racks 216 and/or in servers 218. Note that only one each of racks 216, servers 218, and fans 220 are designated and/or shown to avoid clutter on the drawing page. The components of system 100 can be connected by a network represented by connecting lines in FIG. 2. Furthermore, in some cases, servers 218 may be considered part of a cluster 222(1) or a cluster 222(2).

Generally speaking, one example of a key performance indicator (KPI) of interest to cloud service providers is latency (e.g., delay). For instance, latency can refer to request latency at which virtual machines are deployed. For purposes of this document, the latency can be expressed as percentiles, which might help to avoid skew from outliers that might develop using averages. Note that a KPI could relate to any of a variety of hardware and/or software issues that cause performance anomalies in system 100, such as failures, misconfigurations, protocol errors, environmental issues, or other malfunctions.

As an example, for purposes of explanation, assume that monitoring system 108 observes a latency regression in cluster 222(1) of data center 102(1). In this example, the latency regression is significant to cloud service operations, with latencies at the 70th percentile increasing from 7 minutes to 34 minutes. Subsequently, in this example, the monitoring system observes a similar latency regression in cluster 222(2) of data center 102(1).

In this case, the TPD component 112 can utilize information obtained by the monitoring system 108 to diagnose performance issues for system 100. Investigation of the information from the system can be considered data mining. The TPD component can identify performance anomalies in the information from the system and predicates under which the performance anomalies occur. In this case, example results of tunable predicate discovery are output as the graphs shown in FIGS. 3 and 4.

FIG. 3 illustrates a first example predicate discovery output result 300 from the TPD component 112 (FIG. 2). FIG. 3 shows a baseline (e.g., baseline latency), indicated at 302. FIG. 3 also shows an anomaly indicated at 304, which in this case is an anomalous latency increase over the baseline latency. FIG. 3 provides a predicate 306 for the anomalous latency increase, shown as "Server IP=A.X.Y.Z." In this case, the server 218 (FIG. 2) with IP address "A.X.Y.Z" is correlated to the anomalous latency increase over the respective baseline latency. Stated another way, the predicate 306 specifies an individual server 218 (FIG. 2) within cluster 222(1) (FIG. 2) that is experiencing increased latency.

Similarly, FIG. 4 illustrates a second predicate discovery output result 400 from the TPD component 112 (FIG. 2). FIG. 4 includes a baseline 402 (baseline latency) and an anomaly 404 (anomalous latency increase) over the baseline. FIG. 4 also includes a return code predicate 406 with a value of "2147023436." Predicate 406 is correlated to anomaly 404, the anomalous latency increase over the respective baseline latency. In this example, the return code value relates to an operating system (not shown) pre-fetch failure due to timeouts at the server 218 (FIG. 2).

In the example introduced above relative to FIGS. 1-4, a BIOS update was applied, first in cluster 222(1) and subsequently in cluster 222(2). The BIOS update resulted in low fan 220 speeds in certain situations, causing insufficient cooling and ultimately high temperatures. The high temperatures led to the CPUs of the servers 218 throttling clock speed to reduce heat output. As a result, CPU utilization could not reach a target of 100%, which resulted in the observed latencies. In this case, the performance anomalies (e.g., 304, 404) were not directly tied to a code check-in, the performance anomalies only surfaced with a fan configuration unique to a certain data center 102, and the regression had an unusual cause. These factors can cause the observed performance anomaly to be difficult to diagnose by traditional methods. However, the TPD component 112 can provide an efficient diagnosis, such as through the example predicate discovery results 300 and 400 shown in FIGS. 3 and 4.

Furthermore, in some implementations, predicate discovery can be tuned using a diagnostic level selection from a user. In some cases, the tuning can trade computational resources for quality of anomalies diagnosed. For example, a user may choose to allot additional computational resources to tunable predicate discovery to find relatively smaller performance anomalies. Alternatively, the user may choose to allot fewer computational resources to tunable predicate discovery to limit diagnosis to more significant performance anomalies. As shown in the example in FIG. 3, the server 218 (FIG. 2) with IP address "A.X.Y.Z" exhibited an increased latency of roughly 500 seconds at the 50% percentile. In some cases, tunable predicate discovery could be tuned by specifying diagnosis of larger or smaller performance anomalies, such as 1000 seconds, 200 seconds, etc.

Note that the various devices shown in system 100 are illustrated in FIGS. 1 and 2 with respect to logical roles that can be performed by the devices in operation of system 100. However, the geographical locations of the various devices are not necessarily reflected by system 100. For example, data centers 102(1) and/or 102(2) may be collocated with server operations center 106 and/or diagnostic device 110. As another example, the TPD component 112 and/or monitoring system 108 can be implemented on one or more devices inside an individual data center, such as on one or more racks (e.g., rack 216). Also, cluster 222 may be arranged a variety of ways. For example, a cluster of servers may not include all servers on a rack 216. Also, a cluster may include individual and/or multiple servers from multiple racks, data centers, etc. In addition, functionality described herein with respect to a particular device or devices can be distributed across multiple devices or combined on a single device.

Furthermore, note that FIG. 1 illustrates server operations center 106 as multiple server devices whereas diagnostic device 110 and client device 114 are illustrated as individual computing devices. This reflects one particular implementation, and other implementations may provide characterization functionality and/or client functionality as discussed herein via multiple devices. Likewise, server operations center and/or data center functionality as discussed herein may be performed by individual devices.

Further note that, in practice, there may be additional instances of each computing device mentioned herein, e.g., additional analysis devices, server operations centers, client devices, and data centers. As discussed in more detail below, each of the computing device(s) shown in FIG. 1 can include one or more processing devices, such as computer processors, executing instructions stored on one or more computer-readable storage media such as volatile or non-volatile memories, optical disks, hard drives, flash drives, etc.

While the examples above include data mining and processing data obtained from cloud computing logs and the like, tunable predicate discovery concepts can be applicable to other large datasets upon which some analytic processing is desired. As will be understood, the technology generalizes to analytics tasks in other domains in which robust statistics may be desired. As such, the present invention is not limited to any particular implementations, aspects, concepts, structures, functionalities, and/or examples described herein. Rather, any of the implementations, aspects, concepts, structures, functionalities, and/or examples described herein are non-limiting, and the present invention may be used in various ways that provide benefits and advantages in data mining, analytics, cloud computing datacenters, and/or distributed computing systems in general.

Specific TPD Component Implementation

Figure 5:
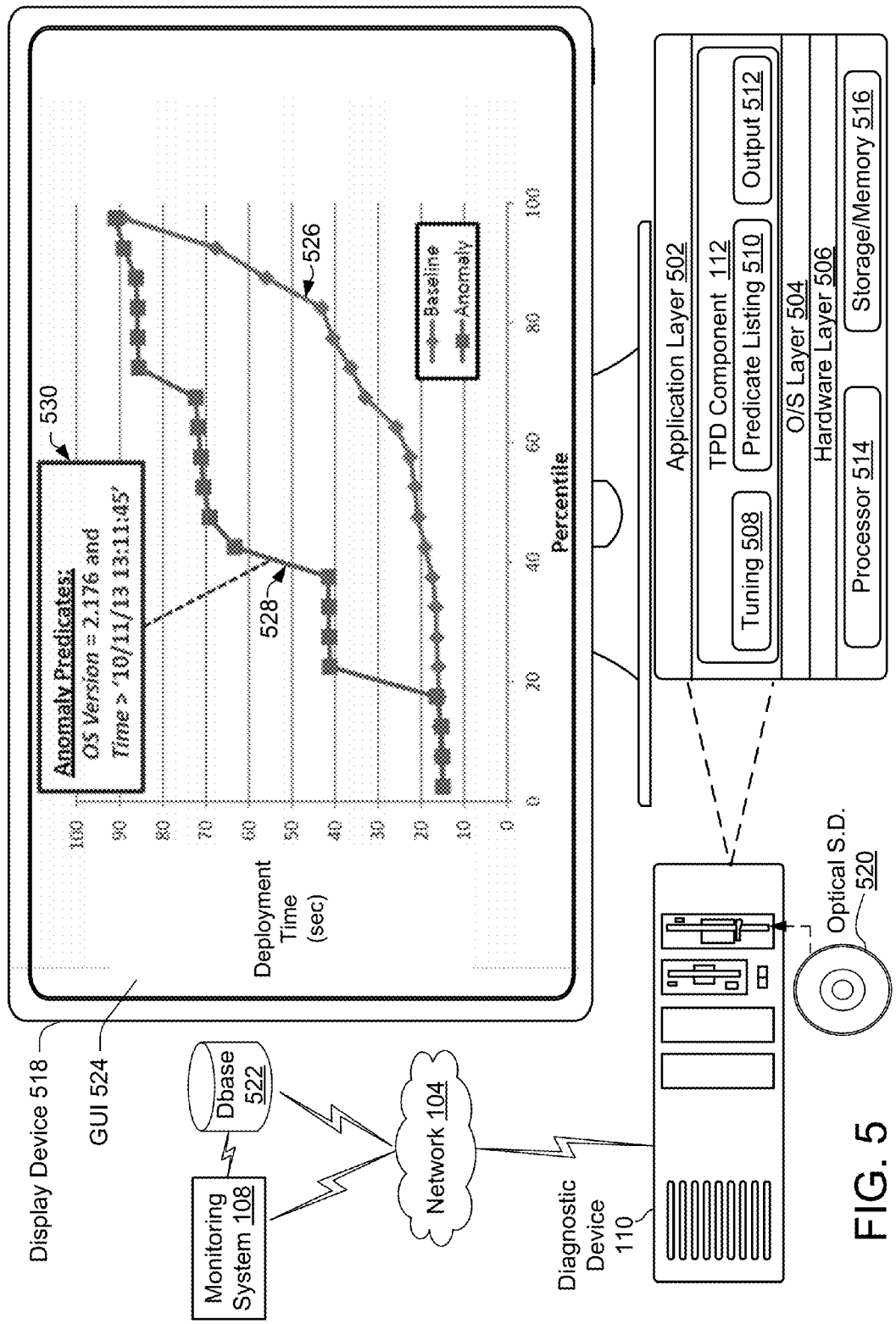
FIG. 5 shows an example computer or computing device that can be configured to accomplish certain concepts in accordance with some implementations.

FIG. 5 shows TPD component 112 embodied on diagnostic device 110. The diagnostic device is one example of a system that can be configured to accomplish certain concepts, as discussed in more detail below. In this case, the diagnostic device is illustrated as a desktop computer. The terms "computer" or "computing device" are used interchangeably, and as used herein can mean any type of device that has some amount of processing capability. While specific examples of computers are illustrated for purposes of explanation, other examples of such computers can include traditional computing devices, such as personal computers, any of the devices introduced relative to FIGS. 1-2, cell phones, smart phones, personal digital assistants, or any of a myriad of ever-evolving or yet to be developed types of devices. Further, a system can be manifest on a single computing device or distributed over multiple computing devices.

In this case, diagnostic device 110 can include an application layer 502, an operating system layer 504, and a hardware layer 506. The TPD component 112 can be manifest as a program or application of the application layer 502, among other configurations. In this example, the TPD component can include a tuning module 508, a predicate listing module 510, and an output module 512. The TPD component can process data, such as service logs, provided over network 104 by monitoring system 108. Alternatively, monitoring system 108 can populate a database 522 with data and the TPD component can process the data in the database.

The hardware layer 506 can include a processor 514, storage/memory (e.g., one or more computer-readable storage media) 516, a display device 518, and/or various other elements. For instance, the other elements can include input/output devices, optical disc readers, USB ports, etc.

Processor 514 can execute computer-readable instructions to provide a functionality, such as a TPD component functionality. Data and/or computer-readable instructions can be stored on storage/memory 516 and/or received from another source, such as optical storage device 520. The storage/memory 516 can include any one or more of volatile or non-volatile memory devices, hard drive storage devices, flash storage devices (e.g., memory sticks or memory cards), and/or optical storage devices (e.g., CDs, DVDs, etc.), among others.

Alternatively to the illustrated configuration of diagnostic device 110, the computer can employ a system on a chip (SOC) type design. In such a case, functionality provided by the computer can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc., that can be used by multiple functionalities.

Generally, any of the functions described herein can be implemented using software, firmware, hardware (e.g., fixed-logic circuitry), or a combination of these implementations. The term "engine," "tool," "component," or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable storage/memory devices, such as computer-readable storage media. The features and techniques of the component are platform-independent, meaning that they may be implemented on a variety of commercial computing platforms having a variety of processing configurations.

As used herein, the term "computer-readable media" and "computer-readable medium" can include signals and hardware. In contrast, the terms "computer-readable storage media" and "computer-readable storage medium" exclude signals. Computer-readable storage media can include "computer-readable storage devices". Examples of computer-readable storage devices include volatile storage media, such as RAM, and non-volatile storage media, such as hard drives, optical discs, and flash memory, among others.

In some implementations, the tuning module 508 can be configured to perform functionality relating to tuning predicate discovery for a data set that the TPD component 112 is investigating. For example, the tuning module can receive input from a user that tunes the predicate discovery. In some cases, the user input can be considered a diagnostic level selection. Some examples of user input related to tuning were discussed above relative to FIG. 3, including an amount of computational resources and/or a magnitude of performance anomaly. User input can also include a value for a baseline from which to measure anomalies. Alternatively, in some cases the tuning module can determine a baseline as a distribution across a data set. In another example, user input can include an amount of time to allot to the predicate discovery.

Another example of user input to the tuning module 508 can include a user specification of how many attributes of a data set to which the predicate discovery process should react. For instance, the user can ask the TPD component 112 to react to anomalies that involve two or more attributes of a data set (e.g., two or more columns of a data table, two or more rows of a data table, etc.). In another instance, the user could specify that the TPD component react to anomalies that affect a system longer than a threshold amount of time and/or more than a threshold percentage of time.

In some implementations, the tuning module 508 can consider availability of resources to tune the predicate discovery. For example, the tuning module can obtain input relating to currently available resources and auto-tune the predicate discovery based on the available resources. In another example, the tuning module can adjust the timing of the predicate discovery process based on temporal differences in availability of resources. For instance, the tuning module can delay the predicate discovery process in order to use computational resources at another time.

In some implementations, the predicate listing module 510 can be configured to perform functionality relating to listing predicates for a data set that the TPD component 112 is investigating. Listing the predicates can include identifying anomalies and discovering the predicates associated with the anomalies. The data set can be considered an example of input to the predicate listing module. Other input to the predicate listing module can include a user selection of an attribute of interest (e.g., key performance indicator) for the TPD component to target for anomaly detection, such as latency. In some cases, an attribute of interest may be represented by a column in a data table. The predicate listing module can use tunable predicate discovery techniques to investigate how the attribute of interest changes over time and/or under which conditions. When the predicate listing module finds a significant change in behavior of the attribute of interest from a baseline, in other words an anomaly, the predicate listing module can determine the associated predicates (conditions) for that anomaly, which identify the anomalous subset with the significant change. The predicates can be manifest in columns in a data table other than the column representing the attribute of interest. Note that the data table can contain numerical and/or non-numerical entries. For instance, a predicate can include a name or abbreviation for a data center.

In some cases, the predicate listing module 510 can receive information from the tuning module 508, such as a magnitude of anomaly to identify. The predicate listing module can also be configured to perform functionality relating to generating anomaly scores and/or ranking the anomalies using the anomaly scores. Functionality performed by the predicate listing module will be described further below relative to FIGS. 6-10, including specific techniques and/or algorithms that can be used for predicate discovery, scoring, etc.

In some implementations, the output module 512 can be configured to perform functionality relating to inputs to and/or outputs from the tuning module 508 and/or the predicate listing module 510. For example, in some cases the output module can present a graphical user interface (GUI) to a user for the purpose of displaying information related to tuning the predicate discovery and/or diagnostic level selection. For instance, the information can include preset and/or starting values for a magnitude of anomaly to identify. The GUI can be used for collecting input from the user that can be used by the tuning module. For example, the user can enter parameters relating to tuning the predicate discovery via the GUI. The output module can also perform functionality relating to outputting predicate discovery results, such as an identification and/or listing of anomalies and/or predicate(s), an indication of a magnitude of an anomaly associated with the predicate(s) (e.g., anomaly scores), a ranked list of the anomalies and associated predicates, a graphic display including the predicate(s), etc. In one example, the output can resemble the graphs and associated text shown in results 300 and 400 in FIGS. 3 and 4. In another example, the output module can output a ranked list of anomalies and associated predicates that fall within a diagnostic level selection received from a user. In some cases, a system manager or analyst can look through the tunable predicate discovery results to determine which results to follow up on.

In the example of FIG. 5, the output module 512 can generate a graphical user interface (GUI) 524 from results obtained from the predicate listing module 510. GUI 524 illustrates a baseline 526, in this case a baseline deployment time, and an anomaly 528, in this case an increased deployment time. GUI 524 also shows two predicates 530, "OS Version=2.176" and "Time>10/11/13, 13:11:45," which are associated with the increased deployment time. In other words, in the example shown in FIG. 5, the TPD component 112 has determined that a certain code change (e.g., Operating System version 2.176) contributed to the increased deployment time after 13:11:45 on Oct. 11, 2013. In this example, the TDP component was able to use a data set from monitoring system 108 to discover predicates 530 (e.g., the code change, the timing) underlying the significant increase in the duration of virtual machine (VM) deployments. The TDP component not only detected the anomaly 528, but also identified that the increased deployment time is most pronounced for the predicates including OS version 2.176, and started after '10/11/13 13:11:45'. With the predicates, a developer could then investigate code changes relevant to the operating system around the indicated time point.

To summarize, several features that can be offered by the TPD component 112 are described above and below. These features can include tuning the predicate discovery process. Another feature can include discovery of predicates that identify an anomalous subset of data. A further feature, discussed in more detail below, can involve scoring and ranking the anomalies.

Example Tunable Predicate Discovery Techniques

Figure 6:
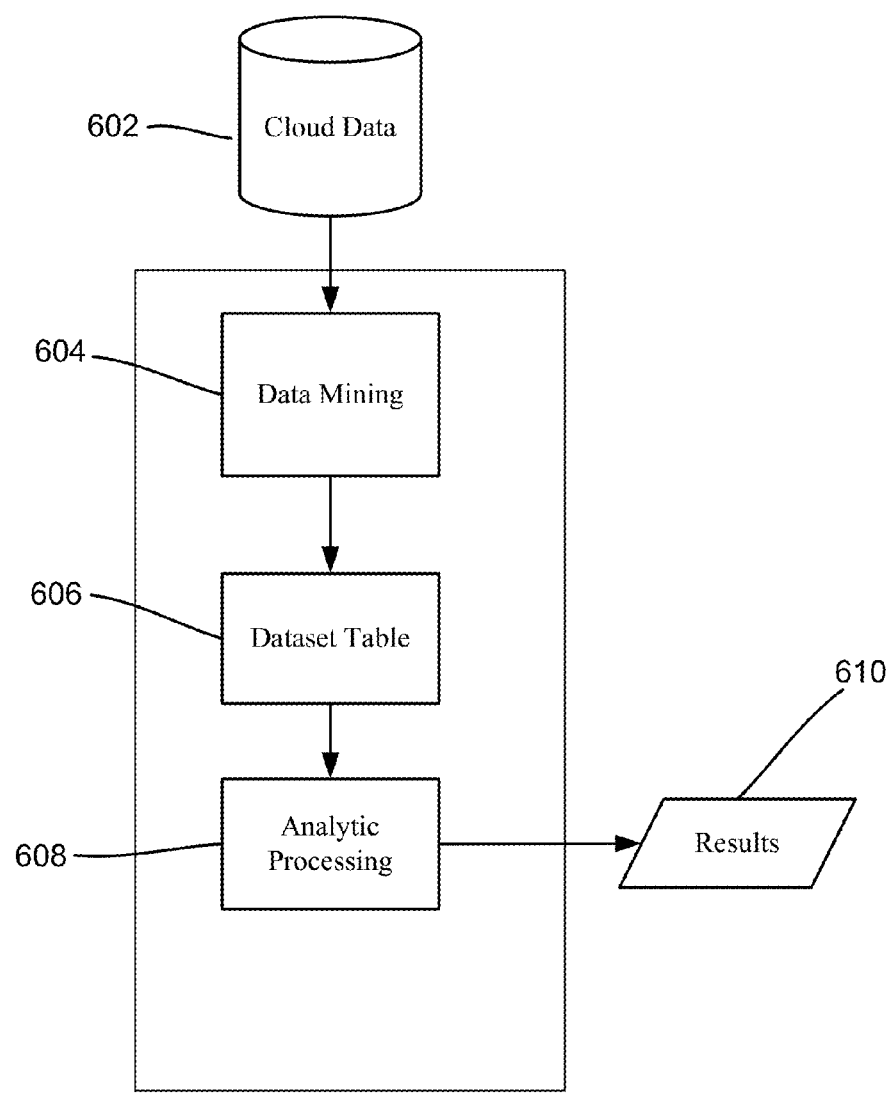
FIGS. 6 and 11-13 are flowcharts for accomplishing certain concepts in accordance with some implementations.

FIG. 6 illustrates an example tunable predicate discovery method 600. Method 600 may be used with respect to providing robust diagnostics to detect performance anomalies, e.g., in cloud services.

In this case, at block 602, a cloud service can output cloud data, such as logs or the like that may be considered (or converted to) tables. At block 604, the data can be mined via a data mining engine in the form of various algorithms. The data mining can provide a dataset table (e.g., table, data set) at block 606, for example. At block 608, analytic processing in the form of various other algorithms can process the dataset table into results, at block 610, which may be used for detecting anomalies. The detected anomalies and/or associated predicates may in turn be used to diagnose problems and determine solutions with respect to the anomalies.

By way of example, consider a table that includes columns representing virtual machine deployment data including cluster name (e.g., location of deployment), time, operating system version, and latency. An attribute of interest to be evaluated for anomalies can be the latency, as virtual machine deployment latency issues can be significant. For instance, finding that a particular operating system at a particular location at a particular time is problematic with respect to deployment latency provides valuable information. Note however that a detected anomaly may be beneficial. For example, a significant improvement in latency duration relative to a given baseline may indicate that the baseline itself has potentially too high of a latency (and thus, for example, some change may have fixed a bug that was previously not identified). Alternatively or additionally, elements included in a data table and/or attributes of interest can include any of a variety of items, such as error rate at which things fail in a cluster, distribution of error messages, how much energy is consumed, etc.

Generally speaking, cloud services can use some form of measurement infrastructure that collects and compiles telemetry information in a suitable form for further analysis. For simplicity assume that the telemetry information can be maintained in a single relation R with attributes $A_1, \ldots, A_k$. Each tuple in this relation can correspond to a single measurement of a particular action. The set of attributes can be partitioned into two non-overlapping sets $A_e$ and $A_m$ such that $A_e$ contains the set of attributes that describe the system environment under which actions are taken, and $A_m$ contains the set of attributes that each correspond to a performance indicator. An example of such a relation is shown in the following Table 1:

TABLE 1

| Time | VM Type | DataCenter | Latency |
|---|---|---|---|
| Jan. 19, 2014 03:14:17 | IaaS | CA | 30 ms |
| Jan. 19, 2014 03:15:09 | PaaS | NY | 40 ms |
| Jan. 19, 2014 03:15:57 | PaaS | CA | 43 ms |
| Jan. 19, 2014 03:16:07 | PaaS | CA | 60 ms |

Each tuple in this relation can contain information pertaining to spawning a new virtual machine. For this relation the set $A_e$ comprises the attributes timestamp (Time), virtual machine type (VM Type), and the data center location (DataCenter) and the set $A_m$ contains the latency attribute (Latency).

With respect to anomalies, $\Sigma(R_i,A_i)$ can be some statistical property computed over values of the attribute $A_i$ for all tuples in the relation R (e.g., a median). Given such a statistical property over a particular attribute $A_i \in A_m$, an anomaly can be a subset of the measurements $S \subseteq R$ such that $\Sigma(S,A_i)$ differs significantly from the baseline property defined by $\Sigma(B,A_i)$ over a baseline set B. In the absence of a pre-specified set B, (e.g., last month's baseline which an enterprise considered normal), the system may use $\Sigma(R_i,A_i)$ as the baseline measure. Predicates (denoted by θ herein) can be conjunctions of equality predicates of the form $A_e=v$ or range predicates of the form $v_{low}<A_e<v_{high}$, where $A_e \in \mathcal{A}_e$, v; $v_{low}$ and $v_{high}$ are constants, and < defines a total order over the domain of the attribute $A_e$. Such predicates can effectively summarize the system environment under which the anomaly occurs and therefore, characterize the conditions which may be related to the cause of the anomaly. The environment attribute participating in a predicate can be referred to as a pivot attribute.

With respect to robustness, robust aggregates can be used. For example, for any subset $S=\sigma_\theta(R)$, where σ is the relational selection operator, how much S differs from R with respect to one specific performance indicator $A_m \in \mathcal{A}_m$ can be defined using suitable aggregate functions. In some cases only functions that are robust (denoted by $\Sigma_r$) to the effect of outliers are considered in this context, such as the median or other percentiles.

With respect to "scoring functions," the robust aggregates, as part of scoring functions, can be used to quantify the impact of an anomaly S with respect to an underlying baseline distribution. For simplicity, R is used as the baseline set; however, the approach can work identically when the baseline is specified separately (e.g., as last month's measurements). Impact may be measured in terms of the change in distribution between S and R for a given performance indicator attribute $A_m$.

In one implementation, a scoring function can take the three parameters $(R,S,A_m)$ as input and can output a single number used for ranking anomalies. Each scoring function can quantify at least two aspects of impact, including (a) how different is the anomaly in terms of the change in (the distribution of) $A_m$, and (b) how many instances of operation/objects are affected by the anomaly. Note that these two factors can trade off against each other because if more points are included in an anomaly, the change in distribution is smaller, and vice versa. An anomaly covering all points in R would in turn have the baseline distribution and thus show no change at all.

To quantify the deviation in $A_m$, a robust aggregation function $\Sigma_r$ can be used to compute aggregates for the attribute $A_m$ over all items in S as well as those in the baseline R. Subsequently, the degree of the anomaly can be measured as the difference between these two values; this difference can be denoted using the notation $\Sigma_r(S,A_m) \sim \Sigma_r(R,A_m)$. Note that the choice of $\Sigma_r$ as well as appropriate difference operator ~ depends on the scenario and the type of the attribute of interest. When A is of a numeric type, $\Sigma_r$ is typically a percentile and ~ the absolute difference between these. On the other hand, for non-numeric categorical attributes (such as error codes or the names of failing function calls), KL-Divergence (a measure of distance between probability distributions) may be used, for example. Here, the divergence can be computed between the probability distribution of values of $A_m$ in the baseline set (R) and the anomalous subset ($S=\sigma_\theta(R)$). Note that the KL-Divergence is a robust measure by default, as each individual item cannot change the overall probability distribution disproportionately.

To quantify how many instances of operation/objects are affected by the anomaly, a function of the size of S can be used, which in practice, is the natural logarithm of |S|, giving the following scoring function:

$$f(R,S,A_m) := (\Sigma_r(S,A_m) \sim \Sigma_r(R,A_m)) \times \log |S|$$

where $(\Sigma_r(S,A_m) \sim \Sigma_r(R,A_m))$ is the deviation from the baseline and log |S| factors in the impact of the number of instances. Note that the use of the logarithm of the size of S (as opposed to using |S| outright) favors anomalies that result in a larger deviation from the baseline (but over a smaller number of instances). Notwithstanding, the algorithms described herein are also applicable when other functions of |S| are used to quantify the effect of the number of instances after some modifications.

Another technique is diversity, in which in order to avoid providing multiple similar explanations for the same anomalies or multiple explanations for the same set of anomalous measurements, a notion of diversity can be incorporated into the mining task. For instance, the two predicates $v_{low} < A_e$ $v_{high}$ and $v'_{low} < A_e < v'_{high}$ such that $v_{low} \approx v'_{low}$ and $v_{high} \approx v'_{high}$ while different, can convey almost identical information. Presenting both the predicates to the user is unlikely to convey any additional information. To incorporate this notion of diversity, the framework supports the specification of a diversity function $f_{div}(\theta_1, \theta_2) \to \{true, false\}$ which returns true if the anomalies explained by the predicates $\theta_1$ and $\theta_2$ are diverse, and false otherwise. The mining algorithms described herein are independent of any specific diversity function.

While diversity may be user defined, a simple and meaningful diversity function is explained herein. Consider two atomic predicates, $\theta_1$ and $\theta_2$, defined over the same environment attribute $A_e$. As explained earlier, the notion of diversity is intended to capture the degree of overlap between the two predicates. While there are multiple metrics to measure such overlap, such as the Jaccard-distance between $\sigma_{\theta_1}(R)$ and $\sigma_{\theta_2}(R)$, an extreme form of diversity is to disallow any overlap, i.e., $\sigma_{\theta_1}(R) \cap \sigma_{\theta_2}(R) = \emptyset$. For atomic predicates, this can be assumed as the default notion of diversity.

The same principle may be extrapolated to anomalies defined by a conjunction of many atomic predicates. For such multi-predicate anomalies, it is likely that only a subset of the predicates also induces a relatively high-scoring anomaly. Consider the following case, using an example "build version 2.17": if all deployments using build version 2.17 have abnormally high latency, then it is likely that the subset of deployments that use build version 2.17 and are deployed on cluster XY Z will also show high latencies. Therefore, unless the latency spike is specific to cluster XY Z, presenting an anomaly [Build=2:17∧ Cluster=XY Z] in addition to the original anomaly [Build=2:17] does not convey additional information and can be avoided to reduce redundant processing. Generalizing from the above, a default notion of diversity to multi-atom predicates can be defined as follows. Let $\mathcal{A}_\theta \subseteq \mathcal{A}_e$ be the set of environment attributes over which the atomic predicates of θ are defined. Two explanation predicates $\theta_1$ and $\theta_2$ can be considered diverse, if and only if, either $A_{\theta_1} \not\subseteq A_{\theta_2}$ and $A_{\theta_2} \not\subseteq A_{\theta_1}$ or, $A_{\theta_1} \subseteq A_{\theta_2}$ or $A_{\theta_2} \subseteq A_{\theta_1}$ and $\sigma_{\theta_1}(R) \cap \sigma_{\theta_2}(R) = \emptyset$. Intuitively, the first condition can require each of the explanations to have at least one distinguishing attribute. The second condition can apply when the first condition does not, and similar to the atomic predicate case, can require an explanation for non-overlapping sets of measurements.

Example Tunable Predicate Discovery Algorithms

In this section, example algorithms that can be used for tunable predicates discovery concepts will be described. In particular, the example algorithms can be used for the diverse anomaly mining task introduced above. In some implementations, the algorithms can extract predicates that identify the top-k highest-scoring diverse anomalies for a measurement log R. Algorithms for identifying anomalies may be defined by atomic predicates over a single attribute in $A_e$, referred to as the pivot attribute. Also included are algorithms for anomalies with multiple pivot attributes.

The particular algorithm used for mining anomalies can depend on the type of pivot attribute (e.g., attribute of interest). Pivot attributes that have an inherent order over values, such as numerical and date-time data types, can be referred to as ordered pivots. Alternatively, attributes that enumerate values from a certain domain, such as cluster names and operating system versions, can be referred to as categorical pivots.

For ordered pivots, range predicates of the form $v_{low} < A_e < v_{high}$ can be extracted. For categorical pivots, equality predicates of the form $A_e = v$, where $A_e$ is the pivot attribute, can be extracted. Note that identifying anomalies for categorical pivot attributes can be computationally straightforward because the problem can be reduced to performing a 'GROUP BY' operation over the pivot attribute followed by computing each group's aggregate score. Therefore, example algorithms for ordered pivots are described below.

In this case, note that $A_m$ denotes a performance indicator over which anomalies are to be detected, $A_e$ denotes a pivot attribute and $\theta_{ij}$ denotes a notational shorthand for the range predicate $v_j$, where $v_i$ and $v_j$ are the $i^{th}$ and $j^{th}$ values of the pivot attribute in sorted order. $S_\theta$ is used as a notational shorthand for $\sigma_\theta(R)$.

Single pivot anomalies may use an example Algorithm 1: Exhaustive Algorithm (e.g., naïve algorithm) for ordered pivots (described further below). However, such a brute force approach may not scale well to very large datasets. To overcome this, additional algorithms may be provided. For example, Algorithm 2: Grid-Refinement can be faster than Algorithm 1 (e.g., 100 times faster), and can extract predicates such that the anomaly scores may be (at least) within a constant factor, α, of those mined exhaustively. An example Algorithm 3: Seed Expansion is also described, which may be even faster (e.g., 1000 times faster than Algorithm 1). Algorithm 3 is based on data characteristics of the data set, and can offer a performance guarantee. An example algorithm for multi-pivot mining is provided as Algorithm 4.

Algorithm 1. The exhaustive algorithm for identifying anomalies on ordered pivots can sort the items by the pivot attribute, and then score the subset of items within every pair of start and end-points. The computational complexity of this algorithm can depend on the cost of computing the scoring function. For a median-based scoring function, this cost can be $O(|\sigma_\theta(R)|)$, where σ explains the anomaly being scored. However, the cost of determining the median for an interval $\theta_{i(j+1)}$ given the median for $\theta_{ij}$ can be reduced to $O(\log |\sigma_{\theta_{ij}}(R)|)$, by maintaining the medians of the interval incrementally with two heaps, comprising a max-heap and a min-heap. This approach can also work for other percentiles; changes may only include the fraction of tuples in each heap. Given this incremental implementation of the scoring function, the cost of the exhaustive algorithm (for N=|R| items) can become $O(N^2 \log N)$.

Algorithm 2. Grid-refinement can be manifest as an algorithm that offers a principled way to potentially trade off the "accuracy" of the mined anomalies for efficiency. Instead of returning the potentially highest scoring anomaly, the algorithm can return an anomaly whose score can be within a factor $\alpha$ (e.g., $\alpha=0.9$) of the highest scoring anomaly. In return for relaxing the score constraint, this algorithm can perform orders of magnitude faster in practice. If a finer score is desired, $\alpha$ may be increased. The speedup seen by this algorithm is the result of exploiting properties typically found in data distributions seen in the context of cloud diagnostics. These properties include "small" anomalies, in which for most datasets, anomalies are expected to constitute a relatively small fraction of all the items. The exhaustive algorithm can spend a significant amount of computation time in ruling out intervals that resemble the baseline, and are therefore non-anomalous. In contrast, the grid-refinement algorithm can rule out large portions of the search space quickly by bounding the score of the anomalies in the search space.

Figure 7:
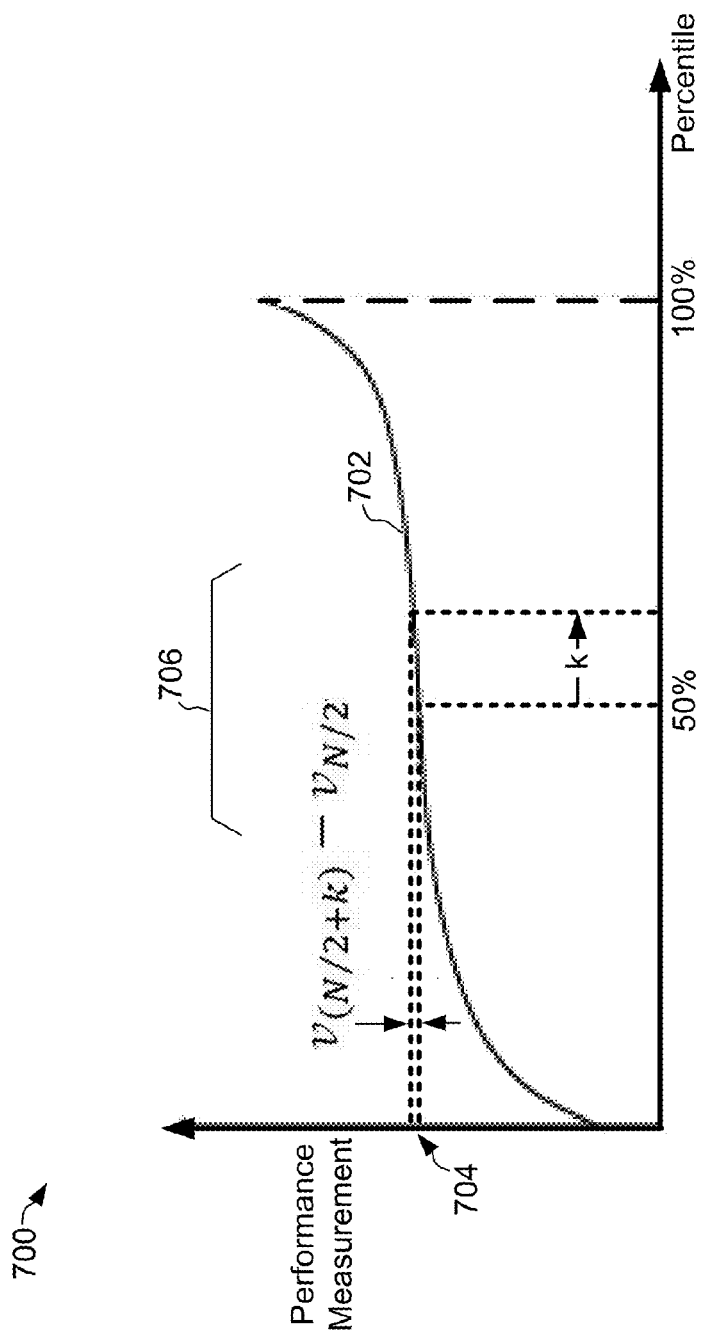
FIGS. 7-10 show graphs related to algorithms for accomplishing certain concepts in accordance with some implementations.
Figure 8:
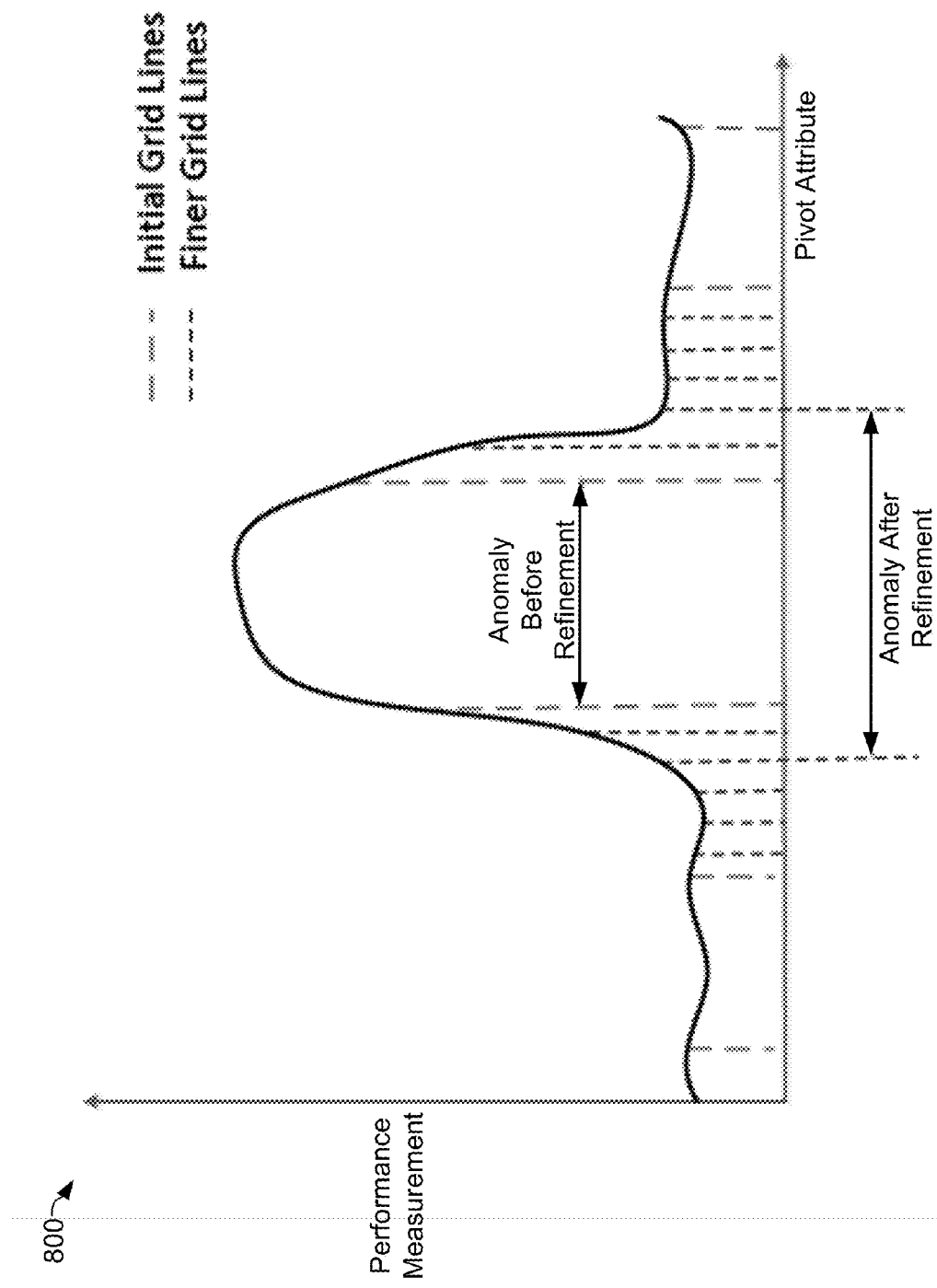

Turning to the stability of robust statistics, for the data distributions typically seen in practice, robust statistics are relatively stable with respect to the addition/removal of a small number of points. FIG. 7 illustrates a graph 700 of an example latency distribution 702, and corresponding median 704. In general, a middle portion 706 of this distribution tends to be "flat", implying that the median does not change significantly in response to the insertion or deletion of k points (which can at most move the median by k points along the x-axis, corresponding to only a small change along the y-axis). This property of stability implies that the score of an anomaly $v_{low} < A_e < v_{high}$ is expected to be approximately equal to that of an anomaly defined by $v'_{low} < A_e < v'_{high}$ if $v_{low} \approx v'_{low}$ and $V_{high} \approx V'_{high}$. The grid-refinement algorithm can exploit this property by using the score of one anomaly to compute tight upper bounds on the scores of anomalies with similar predicates.

The grid-refinement algorithm can use grids of various levels of coarseness to "zoom into" regions in the data containing high scoring anomalies. First, the algorithm can analyze the data at a coarse granularity, choosing the values of $v_{low}$ and $v_{high}$ only from the points along the grid and computing upper bounds on the possible scores of anomalies found at finer granularity. Only for sub-regions where these upper bounds are sufficiently high, anomalies found at a finer grid resolution may be considered, repeating the process until an anomaly is discovered with a score within a factor of $\alpha$ of the potentially highest score of all unseen anomalies. Aspects of the grid-refinement process are illustrated with graph 800 in FIG. 8.

An example grid-refinement algorithm is shown as the $\alpha$-approximate grid-refinement algorithm below (Algorithm 2A). In this example, the $\alpha$-approximate grid-refinement algorithm maintains a priority queue of anomalies represented by 4-tuples $(\theta_{ij}, s, u, g)$, where $\theta_{ij}$ is the interval, s is the score of the current interval, u is the upper bound on the score achievable through arbitrary refinement of the grid near the end-points of the interval $[v_i; v_j]$, and g is the current grid size.

Algorithm 2A $\alpha$-approximate grid-refinement algorithm:
Q ← ø { priority queue of anomalies sorted by an upper bound on their score.}
Let N = |R|
$R_s$ = Sort(R, $A_e$) {Sort instances by pivot attribute $A_e$}
Q. push($\theta_{1N}$, 0, ∞, N) {Initialize Q}
TopK ← ø {The result set.}
while Q ≠ ø ∧ |TopK| < k do
   ($\theta$, s, u, g) ← Q.dequeue
   if s/u ≥ $\alpha$ then
      if $\wedge_{\theta_i \in TopK}$ ($f_{div}$ ($\theta$, $\theta_i$)) then
         TopK.Add($\theta$ )
   else
      for all r ∈ Refine($\theta$, g) do
         Q. push(r)
return  TopK The example grid-refinement algorithm dequeues anomalies from the priority queue in order of their upper bound on scores. If the current score is within an $\propto$ factor of the bound on the scores, then the current score is added to the result set after checking the diversity constraint. Otherwise, the interval is refined using the "zoom in" procedure shown in the example refinement procedure below in Algorithm 2B:

Algorithm 2B

Refinement procedure for a predicate $\theta_{low,high}$ at grid size g:
Let $\theta_{low,high}$ at grid size g be the interval to be refined.
$g_r$ ← g/ConvergenceRatio {Refined grid size.}
$Q_{refined}$ ← ø { The set of refined anomalies..}
for i ← (low – g) : $g_r$ : low do
   for j ← (i + $g_r$) : $g_r$ : (high + g)do
      $s_{ij}$ = f ( R, $S_{\theta_{ij}}$, $A_m$)
      $u_{ij}$ = BoundScore (R, $S_{\theta_{ij}}$, $A_m$, $g_r$)
      $Q_{refined}$. Add($\theta_{ij}$, $s_{ij}$,$u_{ij}$, $g_r$)
return  R During refinement of an interval, for each possible refined interval at a finer grid size, the score of the anomaly as well as an upper bound on the possible improvement achievable can be computed by "refining" the grid, i.e., the maximum score possible for an anomaly when using (a) an arbitrarily fine grid and (b) the endpoints $v_{low}$ and $v_{high}$ being within one grid size of the original "coarse" pair of endpoints (see "Anomaly After Refinement" in FIG. 8). The algorithm can terminate once the top-k approximate anomalies are determined.

For correctness, a "BoundScore" function can provide a sound upper bound on the score of any given predicate, i.e., for any interval $\theta_{ij}$ at grid g, if $Q_{refined}$ is the set of intervals obtained by refining $\theta_{ij}$ as shown in Algorithm 2B, then $\forall \theta_{i'j'} \in Q_{refined}$, $f(S\theta_{i'j'},R, A_m)<u$. One such method of estimating the upper bound is shown for scoring functions using the median as the robust statistic of choice. Extending it to arbitrary percentiles can be trivial using a similar technique.

For example, let $S_{\theta_{ij}}$ be an interval at grid size g for which the upper bound is to be estimated. The specific refinement procedure described above can restrict a potentially maximum deviation of the median to 2 g points, since the refinement only allows addition of points by expansion of the interval by, at max, g points on either end of the interval. Let $v_k$ be the $k^{th}$ value in sorted order of the attribute $A_m$ among the points in $S_{\theta_{ij}}$. Therefore, $v_{N/2}$ denotes the median value. Since the median for any refinement can at most deviate from the median by 2 g points, the score for any refinement of the interval is bounded by $(v_{N/2+2g} - v_{N/2}) \times \log(|S_{\theta_{ij}}|)$. For typical distributions, the change in median value, and therefore the gap between the upper bounds and the (potentially best) actual score for an interval, can be expected to be relatively small due to the stability around medians illustrated in FIG. 7.

With respect to correctness, the grid-refinement algorithm can satisfy the invariant that an anomaly is added to the set of top-k anomalies if and only if the anomaly's score is within an oc factor of the highest scoring anomaly. Let $S_\theta$ be the first anomaly to be included in the top-k by the algorithm as shown in Algorithm 2A. Also, let $S_\theta^{opt}$ be the highest scoring anomaly and $S_\theta$ be an anomaly at a grid resolution of g. Let $S_\beta$ be the anomaly which contains $S_\theta^{opt}$ and has both endpoints at the grid with resolution g. Since the algorithm dequeues anomalies according to upper bounds on scores, it is known that $u(S_\theta) \geq u(S_\beta)$. By soundness of the bounding function and the refinement procedure, it can be inferred that $u(S_\beta) > f(S_\theta^{opt}, R, A_m)$. Therefore, $u(S_\theta) \geq f(S_\theta^{opt}, R, A_m)$. Also, since the algorithm chooses the anomaly, it is known that $f(S_\theta, R, A_m)/u(S_\theta) \geq \alpha$. Therefore, $f(S_\theta, R, A_m) \geq \alpha \times f(S_\theta^{opt}, R, A_m)$.

Algorithm 3. An example seed expansion algorithm will now be discussed. The grid-refinement algorithm can rely on the stability of medians property (see FIG. 7). However, distributions seen around much higher (or much lower) percentiles are often less stable. An algorithm for faster detection of anomalies aimed in particular at scoring functions based on these percentiles, or for fast analysis of very large data sets is described further for seed expansion. This algorithm offers a significantly lower asymptotic overhead ($O(N^{1.5})$) as well as significantly faster wall-clock runtime. However, as opposed to the grid-refinement algorithm, which can guarantee a constant approximation ratio, the scores of the anomalies mined by the seed expansion algorithm can be within a data-dependent factor of the optimal anomalies.

The intuition behind the seed expansion algorithm is based on anomalies for high/low percentiles typically containing extreme (i.e., relatively high or low) values for the performance indicators. To simplify exposition, an assumption can be made to seek anomalies corresponding to large performance indicator values. The seed expansion algorithm can first choose the top-$\sqrt{N}$ number of points in order of value of the performance indicator; these points are called seed points. For each seed point a determination can be made whether it corresponds to an isolated transient anomaly (which may be ignored), or is part of a systemic anomaly (which is to be detected). In the former case, the seed point can be expected to be a local extremum surrounded (along the pivot axis) by many points that may roughly resemble the baseline distribution. In the latter case, further extreme measurement values can be expected in the neighborhood of the seed.

To avoid situations where potentially all the seed points chosen are transient anomalies, an initial smoothing step can be applied before choosing the seed values. Here, each value $v_i$ of the performance indicator can be replaced with the median value among all values in an interval along the pivot-axis of size c and "centered" at $v_i$; then the largest value can be chosen among these. This way, single outlier points within a region of low values are not chosen as seeds, eliminating (single-point) transient anomalies from consideration.

Figure 9:
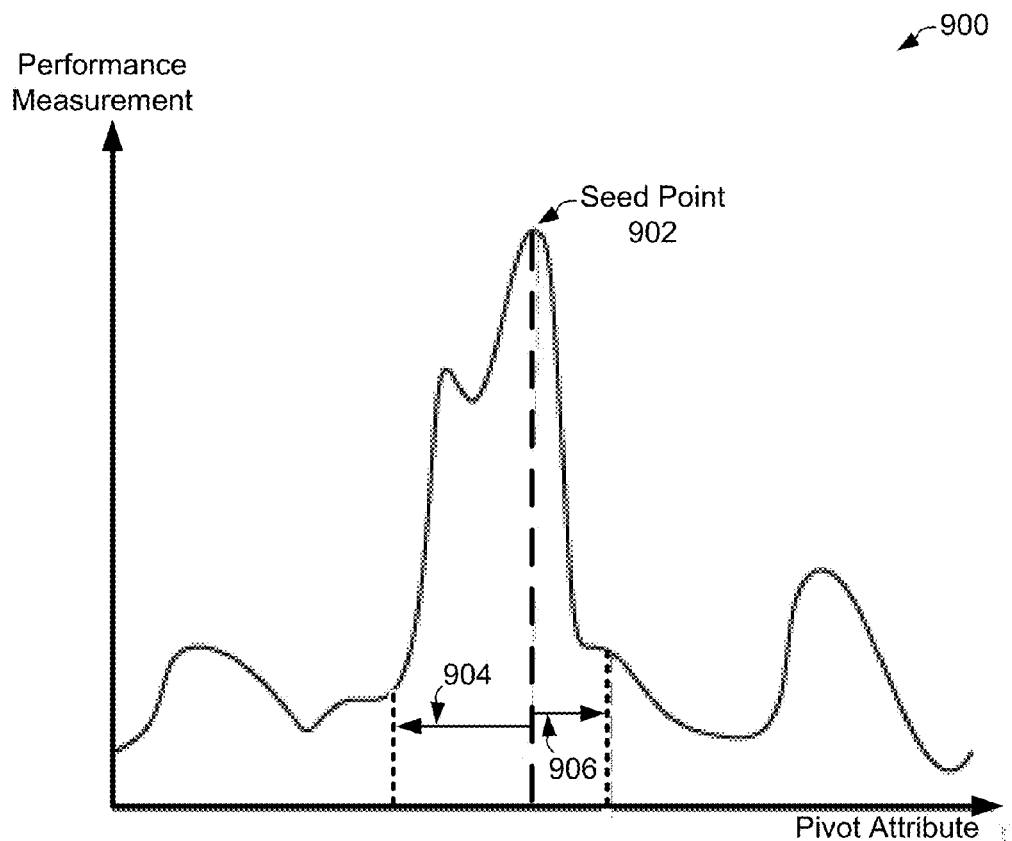

Given any seed point identified by the index s with the pivot value $v_s$, the algorithm can initialize a single-item anomaly with the predicate $v_{low} = v_s < A_e < V_{high} = v_s$ and can try to expand this anomaly by adding points in each direction along the pivot axis. If the seed point is part of a systemic anomaly, the score of the resulting anomaly can be expected to grow with the expansion. On the other hand, if the seed corresponds to a transient anomaly, the score can be expected to decrease (eventually) as points resembling the background distribution are added. Seed expansion is generally illustrated in FIG. 9. FIG. 9 illustrates a graph 900, including a seed point 902. As shown in FIG. 9 the seed point can be expanded to the left, indicated at 904, and/or to the right, indicated at 906.

The procedure for expansion of a single seed point is shown below in Algorithm 3:

---

Algorithm 3

Expansion of a single seed point (l and r denote left and right, respectively):
Let s be the index of the seed in sorted order of pivot Ae
$l_{new} \leftarrow s; r_{new} \leftarrow s$
MaxScore $\leftarrow -\infty$
While $f(S_{[l_{new}, r_{new}]}, R, A_m) \geq$ MaxScore do
    $l \leftarrow l_{new}; r \leftarrow r_{new}$
    MaxScore $\leftarrow f(S_{[l_{new}, r_{new}]}, R, A_m)$
    $score_l \leftarrow f(S_{[l-1, r]}, R, A_m)$
    $score_r \leftarrow f(S_{[l, r+1]}, R, A_m)$
    $score_{lr} \leftarrow f(S_{[l-1, r+1]}, R, A_m)$
    Let $[l_{new}, r_{new}]$ be the interval corresponding to max $(score_l, score_r, score_{lr}$.
return [l, r]

---

The procedure for expansion of a single seed point can expand a seed until an expansion does not result in an improvement in the anomaly score. This expansion procedure can be repeatedly invoked for $\sqrt{N}$ seed points. Seed points which are already included in the expanded anomalies formed out of previous seed points can be excluded from consideration as seeds. The algorithm can maintain all expanded intervals in a sorted list from which the highest-scoring set of k diverse anomalies can be returned as the final result.

The quality of the anomalies mined by the seed expansion algorithm depends on how easily distinguishable the anomalies are from the background distribution. In some implementations, two properties of the dataset can be used to quantify (e.g., score) this distinctiveness of anomalies. A first property can be the maximum gradient (i.e., $\max_i (v_{i+1} - v_i)$) of the performance indicator attribute with respect to the pivot attribute, denoted $\delta_{max}$. This measure can be computed after smoothing, effectively making this the potentially maximum gradient over any interval of size c. For a second property, let $$\Delta = \frac{(v_N - v_{N/2})}{N/2}$$

be the average gradient between the median and the maximum value. Also, let $$\alpha = \frac{\delta max}{\Delta}.$$

Then it can be shown that if $S_\theta$ is the best anomaly mined by the seed expansion algorithm and $S_{\theta\ opt}$ is the top scoring pattern mined by the exhaustive algorithm, then $$f(S_\theta, R, A_m) \geq \frac{2\log(N\alpha)}{\alpha \log N} f(S_{\theta opt}, R, A_m),$$

where f is the median based scoring function and $|S_{\theta\ opt}| \leq \sqrt{N}$. In some cases, for a distribution with a very pronounced anomaly, the value of $\alpha$ is expected to be high since $\delta_{max}$ is expected to be high. This in turn implies that the approximation factor $$\frac{2\log(N\alpha)}{\alpha \log N}$$

evaluates to a lower value since the contribution of $\alpha$ to the denominator dominates. Therefore, as expected, if anomalies are more pronounced in a distribution, the algorithm can identify the anomalies more accurately, giving the desired behavior of identifying the potentially most prevalent anomalies in a highly scalable manner.

Algorithm 4. An example algorithm for multi-pivot mining will now be discussed. Anomalies can occur due to system conditions which may only be reliably captured by predicates over multiple attributes. For example, response times for operations may degrade only under high memory contention when there also are multiple active threads on a machine. A brute force approach for identifying such multi-attribute anomalies would be to check all combinations of predicates for all subsets of environment attributes, which is clearly computationally prohibitive. This computational hardness is not unique to the problem, but is an instance of a general class of problems observed in other domains, such as optimal decision tree construction. Therefore, a first approach can be to construct multi-pivot anomalies greedily. Shown below is a sampling and co-refinement based scheme for multi-pivot mining using a greedy mining procedure, GreedyMine(R,f,$A_m$,k), which returns the top-k multi-pivot anomalies ordered by the scoring function f. For example, $\theta_c$ can be used to denote the predicates on the sampled data and $\theta_r$ can be used to denote the predicates on the entire data.

---

Algorithm 4

Sampling and co-refinement based scheme for multi-pivot mining:
$R^\gamma \leftarrow$ RandomSample (R, $\gamma$) {Choose a random sample w/o replacement of size $\gamma \gamma \times |R|$}

$$f^\gamma(R^\gamma, S, A_m) := (\Sigma(R^\gamma, A_m) \sim \Sigma(S, A_m)) \times \log\left(\frac{|R^\gamma|}{\gamma}\right)$$

TopKCoarse $\leftarrow$ GreedyMine($R^\gamma$, f', $A_m$)
TopKRefined $\leftarrow \emptyset$
for all $\theta_c \in$ TopKCoarse do
  $\theta_r \leftarrow \theta_c$; g $\leftarrow |\theta_r|$
  While g >= 1 do
    for all $\theta_r^i \in \theta_r$ where $\theta_r = \wedge_i \theta_r^i$ do
      $\theta'_r \leftarrow \theta'_r \wedge \text{argmax}_{\theta \in Refine(\theta_r^i, g)} f(S_\theta, S_{\theta_r} A_m)$
    $\theta'_r \leftarrow \theta'_r$;
  g $\leftarrow$ g/ConvergenceRatio
  TopKRefined.Add($\theta_r$)
Return TopKRefined

---

In practice, the vast majority of anomalies can be detected well using greedy techniques. However, to detect anomalies that are not detected well with greedy techniques, an algorithm is proposed that co-refines pivots jointly across different attributes. Finally, the algorithm leverages a property typically seen in real-life data distributions (namely, a bound on the extent to which the score of the highest-scoring anomaly characterized by l predicates is reduced when only a subset of the predicates is considered) to provide a tractable algorithm that gives quality guarantees on the scores of the mined anomalies.

A purely greedy algorithm for mining anomalies may split a single anomaly into multiple anomalies due to lack of foresight into the potential refinement by joining with other pivots. For handling such corner cases, an example co-refinement strategy is presented: first the greedy mining algorithm can be run on a small random sample of the data with a weighted scoring function where each data point is weighted by the inverse sampling ratio. This can give an initial "rough" set of anomalies. Then these anomalies can be co-refined using the full data set as follows: an approach similar to the grid-refinement algorithm of gradually "zooming in" to determine the exact interval boundaries for each predicate can be adopted. However, instead of refining attributes one after the other, for each anomaly, potentially best intervals can be determined across all constituent pivot attributes at a particular grid-size before drilling down to the next grid level.

Figure 10:
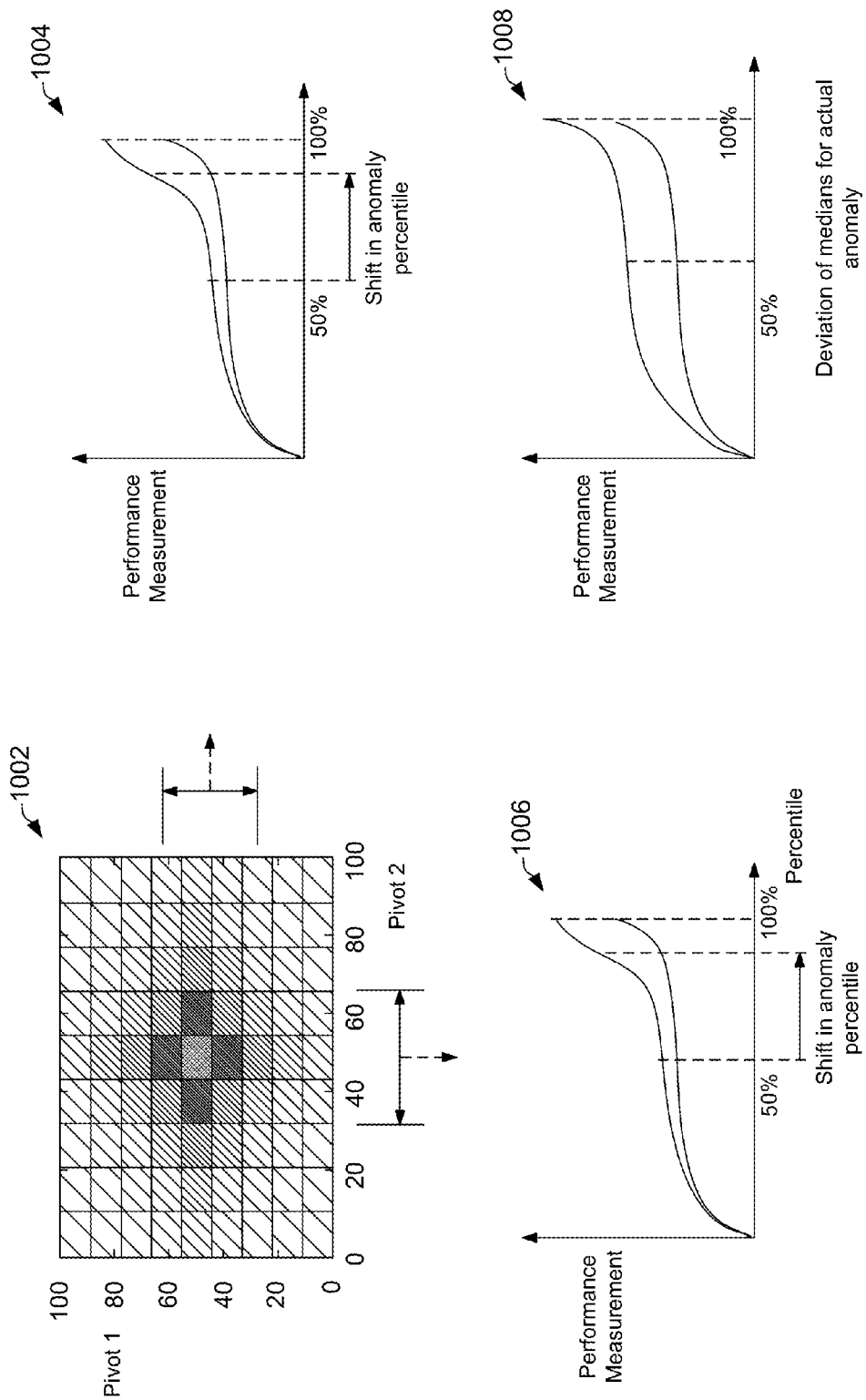

$\alpha$-approximate multi-pivot refinement will now be described. While computing the top-scoring anomalies for adversarial data distributions can be computationally prohibitive, properties typically seen in real-life data can be leveraged to obtain a tractable algorithm with absolute guarantees on the anomaly score. First, to illustrate these data properties, an example anomaly is considered which is best characterized by intervals along two different pivot attributes. FIG. 10 shows a heat-map representation 1002 of the anomalous measurement values with respect to the two pivot attributes (Pivot 1 and Pivot 2) for such an anomaly. FIG. 10 also shows two percentile distributions 1004 and 1006 for (predicates on) each of the pivot attributes when considered independently, and a third percentile distribution 1008 for when the pivot attributes are considered together. Clearly, the deviation between the anomaly median and the background distribution, observed when both the attributes are considered together, shifts towards higher percentiles when only one of pivots is considered. This is due to the addition of non-anomalous points to the anomaly. These non-anomalous points can only be filtered by pivoting on the secondary attribute. By limiting the extent to which this shift occurs, sound bounds can be provided for the improvement possible in anomaly scores.

Maximum Refinement Ratio: Given a multi-pivot anomaly delimited by l predicates over pivot attributes, the maximum refinement ratio is the largest constant $\gamma$ such that there exists an ordering of the predicates $$O \text{ such that } \frac{|S_{A_{i+1}\theta_{o(i+1)}}|}{|S_{A_i\theta_{o(i)}}|} \geq \gamma \text{ where } \gamma \in [0, 1].$$

Bounding multi-pivot anomaly scores will now be described. It can be assumed that for a given log relation R and a performance indicator attribute $A_m$, the maximum refinement ratio $\gamma$ is either known or is estimated conservatively ($\gamma=1$ being most conservative). Under this assumption, given an l-pivot anomaly $S_{\theta l}$ it is possible to get an estimate of the potential improvement in the anomaly score by pivoting on additional attributes. Let $n=|S_{\theta l}|$. If the maximum number of attributes in any anomaly is m, for any l-attribute anomaly, the minimum size of an m-predicate anomaly formed by extending $S_{\theta l}$ has size at least $n_{min} = \gamma^{m-l} n$. For the particular case where the aggregation function is the median, the maximum score obtainable by extending $S_{\theta l}$ is then bounded by $$\max_{i \in \left[n/2, n\left(1 - \frac{\gamma^{m-l}}{2}\right)\right]} (v_i - v_{[\frac{N}{2}]}) \times \log(2i).$$

This is because in the best case, all the points filtered by additional pivots are lower than the median value $S_{\theta l}$ and therefore cause a rightward shift of the median. As more predicates over pivots are added to the anomaly, this estimate becomes tighter.

As in the case of the single-pivot grid-refinement algorithm, by maintaining an upper bound over the best possible l-pivot (unseen) refinements for anomalies with fewer pivots, an approximate multi-pivot mining algorithm (similar to the α-approximate grid-refinement algorithm shown above, except for the refinement procedure and the initialization step) can be designed.

In some implementations, the above-described example techniques can be used singularly or in combination to accomplish tunable predicate discovery concepts. For example, a TPD component (e.g., TPD component 112) could select an algorithm dependent on a diagnostic level selection received from a user, or through auto-tuning described above relative to FIG. 5. In some cases, a blend of components of the example algorithms described above could be used by the TPD component. Of course, these examples are not meant to be exhaustive and/or limiting, and other techniques for tunable predicate discovery are considered.

Methods

Figure 11:
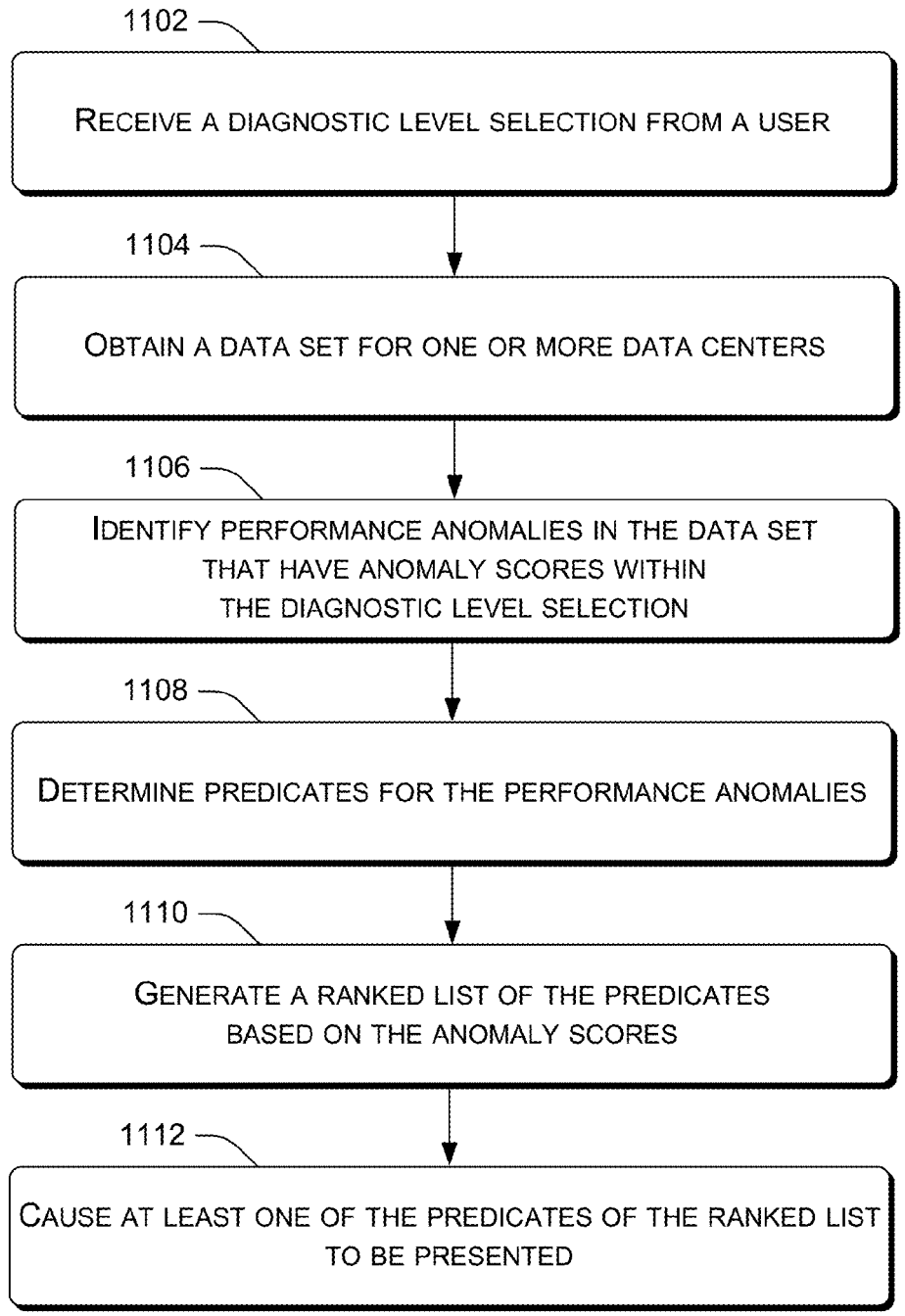

FIG. 11 illustrates a first flowchart of an example technique or method 1100 for tunable predicate discovery. In some implementations, method 1100 can be performed by a TPD component, such as TPD component 112 (see FIGS. 1, 2, and 5). Alternatively, the method could be performed by other devices and/or systems.

At block 1102 of FIG. 11, method 1100 can receive a diagnostic level selection from a user, such as through a GUI, as described above relative to FIG. 5. At block 1104, the method can obtain a data set for one or more data centers. At block 1106, the method can identify performance anomalies in the data set that have anomaly scores within the diagnostic level selection. In some implementations, the diagnostic level selection can be related to a magnitude of the performance anomalies. In some cases, the diagnostic level selection can tune the magnitude of the performance anomalies with respect to computational resources allotted to identifying the performance anomalies.

At block 1108, method 1100 can determine predicates for the performance anomalies. For example, the method can determine conditions under which individual performance anomalies occur. At block 1110, the method can generate a ranked list of the predicates based on the anomaly scores. In some cases, the ranked list can include an indication of the anomaly scores. At block 1112, the method can cause at least one of the predicates of the ranked list to be presented. In some implementations, causing at least one of the predicates to be presented can include displaying the at least one of the predicates on a graphical user interface.

Figure 12:
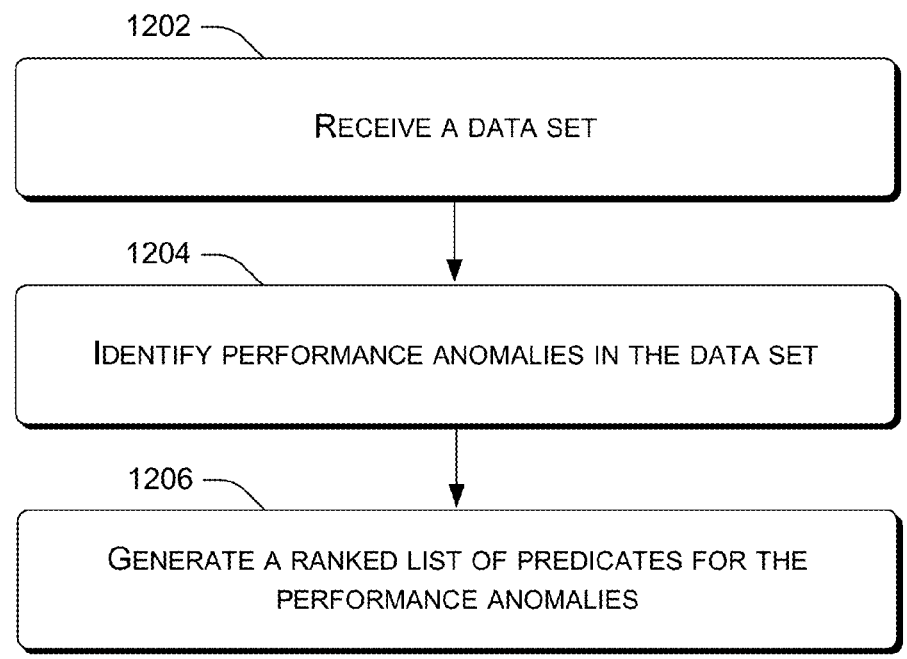

FIG. 12 illustrates a second flowchart of an example technique or method 1200 for tunable predicate discovery.

At block 1202, method 1200 can receive a data set. In some cases, the data set can be derived from service logs describing performance of one or more data centers. At block 1204, the method can identify performance anomalies in the data set. In some cases, the method can auto-tune an amount of computational resources used to identify the performance anomalies. In some cases, the method can identify the performance anomalies in a selectably tunable manner via user input related to a magnitude of the performance anomalies. In some cases, the method can identify the performance anomalies based on changes in distribution of values of an attribute of interest. The attribute of interest can be specified through user input. Alternatively, the attribute of interest may not be specified by the user. In other cases, the method can identify the performance anomalies based on changes in distribution of values of multiple attributes of interest.

At block 1206, method 1200 can generate a ranked list of predicates for the performance anomalies. For example, the predicates can include conditions under which the performance anomalies occur. In some cases, the method can determine anomaly scores for the performance anomalies. The method can also generate the ranked list of the predicates using the anomaly scores. For example, an individual anomaly score can indicate a magnitude of an individual performance anomaly. In some cases, generating the ranked list of predicates can include generating a graphical user interface (GUI) that displays the ranked list of the predicates. For example, the method can generate a GUI that displays a graphic of an individual performance anomaly relative to a baseline and at least one associated predicate.

Figure 13:
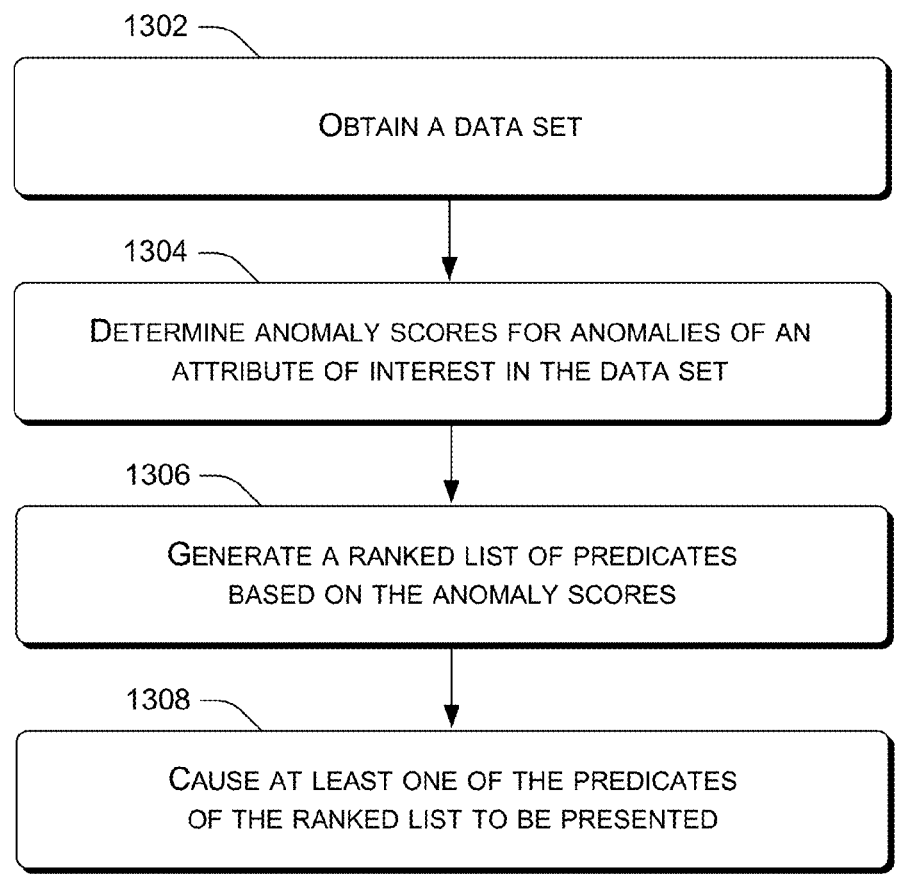

FIG. 13 illustrates a third flowchart of an example technique or method 1300 for tunable predicate discovery.

At block 1302, method 1300 can obtain a data set. At block 1304, method 1300 can determine anomaly scores for anomalies of an attribute of interest in the data set. In some cases, the attribute of interest can be selected by a user.

At block 1306, method 1300 can generate a ranked list of predicates based on the anomaly scores. In some cases, inclusion of individual predicates in the ranked list can be influenced by a level of the anomaly scores that is selected by a user. At block 1308, the method can cause at least one of the predicates of the ranked list to be presented.

Additional Examples

Example implementations are described above. Additional examples are described below. One example can receive a diagnostic level selection from a user. The example can obtain a data set for one or more data centers. The example can identify performance anomalies in the data set that have anomaly scores within the diagnostic level selection. The example can determine predicates for the performance anomalies. The example can generate a ranked list of the predicates based on the anomaly scores. The example can cause at least one of the predicates of the ranked list to be presented.

Another example includes any of the above and/or below examples where the diagnostic level selection is related to a magnitude of the performance anomalies.

Another example includes any of the above and/or below examples where the diagnostic level selection tunes the magnitude of the performance anomalies with respect to computational resources allotted to the identifying the performance anomalies.

Another example includes any of the above and/or below examples where the ranked list includes an indication of the anomaly scores.

Another example includes any of the above and/or below examples where the causing includes displaying the at least one of the predicates on a graphical user interface.

Another example can include a processing device, a storage device, and a tunable predicate discovery component stored on the storage device. The processing device can be configured to execute the tunable predicate discovery component as computer-executable instructions. The example can receive a data set. The example can identify performance anomalies in the data set. The example can generate a ranked list of predicates for the performance anomalies.

Another example includes any of the above and/or below examples where the instructions further comprise generating a graphical user interface (GUI) that displays the ranked list of the predicates.

Another example includes any of the above and/or below examples where the instructions further comprise auto-tuning an amount of computational resources used to identify the performance anomalies.

Another example includes any of the above and/or below examples where the predicates include conditions under which the performance anomalies occur.

Another example includes any of the above and/or below examples further comprising determining anomaly scores for the performance anomalies.

Another example includes any of the above and/or below examples further comprising generating the ranked list of the predicates using the anomaly scores Another example includes any of the above and/or below examples where an individual anomaly score indicates a magnitude of an individual performance anomaly.

Another example includes any of the above and/or below examples where the instructions further comprise identifying the performance anomalies in a selectably tunable manner via user input related to a magnitude of the performance anomalies.

Another example includes any of the above and/or below examples where the instructions further comprise identifying the performance anomalies based on changes in distribution of values of an attribute of interest.

Another example includes any of the above and/or below examples where the attribute of interest is specified through user input.

Another example includes any of the above and/or below examples further comprising identifying the performance anomalies based on changes in distribution of values of multiple attributes of interest.

Another example includes any of the above and/or below examples further comprising generating a graphical user interface (GUI) that displays a graphic of an individual performance anomaly relative to a baseline and at least one associated predicate.

Another example includes any of the above and/or below examples where the data set is derived from service logs describing performance of one or more data centers.

Another example can obtain a data set. The example can determine anomaly scores for anomalies of an attribute of interest in the data set. The example can generate a ranked list of predicates based on the anomaly scores. The example can cause at least one of the predicates of the ranked list to be presented.

Another example includes any of the above and/or below examples where the attribute of interest is selected by a user.

Another example includes any of the above and/or below examples where inclusion of individual predicates in the ranked list is influenced by a level of the anomaly scores that is selected by a user.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to tunable predicate discovery are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented by one or more processing devices, the method comprising:
   obtaining a data set for one or more data centers;
   receiving a diagnostic level selection from a user, the diagnostic level selection being used to tune a magnitude of performance anomalies in the data set to an amount of computational resources allotted to identifying the performance anomalies;
   using the allotted amount of the computational resources, identifying the performance anomalies in the data set that have anomaly scores within the diagnostic level selection;
   determining predicates for the identified performance anomalies;
   generating a ranked list of the predicates based at least in part on the anomaly scores; and
   causing at least one of the predicates of the ranked list to be presented.

2. The method of claim 1, further comprising tuning the magnitude of the performance anomalies by:
   in a first instance, allotting relatively more computational resources to find relatively smaller performance anomalies in accordance with a first diagnostic level selection; and
   in a second instance, allotting relatively fewer computational resources to find relatively larger performance anomalies in accordance with a second diagnostic level selection.

3. The method of claim 1, wherein the performance anomalies relate to latency in the one or more data centers.

4. The method of claim 1, wherein the ranked list includes an indication of the anomaly scores.

5. The method of claim 1, wherein the causing includes displaying the at least one of the predicates on a graphical user interface.

6. A system comprising:
   a processing device; and
   a storage device storing computer-executable instructions which, when executed by the processing device, cause the processing device to:
   receive a data set;
   determine an available amount of computational resources to perform anomalous latency identification on the data set;

based at least in part on the available amount of computational resources, select a particular latency magnitude to use for the anomalous latency identification;

using the available amount of computational resources, identify anomalous latencies in the data set based at least in part on changes in distribution of values of multiple attributes of interest associated with the data set, the identified anomalous latencies exhibiting the particular latency magnitude;

generate predicates for the identified anomalous latencies, the predicates being conditions under which the identified anomalous latencies occur; and cause one or more of the predicates to be presented.

7. The system of claim 6, wherein the predicates include at least one of a hardware misconfiguration, a software failure, a protocol error, or an environmental issue.

8. The system of claim 6, wherein the computer-executable instructions further cause the processing device to:

determine a number of the multiple attributes of interest based at least in part on user input.

9. The system of claim 6, wherein the at least one of the identified anomalous latencies relates to a rate of requests for deployment of virtual machines by a cloud service provider.

10. The system of claim 6, wherein the computer-executable instructions further cause the processing device to:

determine anomaly scores for the identified anomalous latencies; and generate a ranked list of the predicates using the anomaly scores.

11. The system of claim 10, wherein an individual anomaly score indicates a respective magnitude of an individual identified anomalous latency.

12. The system of claim 6, wherein the computer-executable instructions further cause the processing device to:

select the particular latency magnitude based at least in part on user input.

13. The system of claim 6, wherein at least one of the multiple attributes of interest is associated with a cloud service hardware component.

14. The system of claim 6, wherein at least one of the attributes of interest is specified through user input.

15. The system of claim 6, wherein at least one of the attributes of interest is associated with a data center performance characteristic.

16. The system of claim 6, wherein the computer-executable instructions further cause the processing device to:

generate a graphical user interface (GUI) that displays a graphic of an individual identified anomalous latency relative to a baseline and at least one associated predicate.

17. The system of claim 6, wherein the data set is derived from service logs describing performance of one or more data centers.

18. A system comprising:

a processing device; and a storage device storing computer-executable instructions which, when executed by the processing device, cause the processing device to:

obtain a data set;

based at least on a diagnostic level selection, determine a magnitude of anomalies of an attribute of interest in the data set to be identified;

identify the anomalies of the attribute of interest using an amount of computational resources specified by the diagnostic level selection;

determine anomaly scores for the anomalies of the attribute of interest;

generate a ranked list of predicates based at least in part on the anomaly scores; and cause at least one of the predicates of the ranked list to be presented.

19. The system of claim 18, wherein the at least one of the predicates is a condition under which at least one of the anomalies occurred.

20. The system of claim 18, wherein the computer-executable instructions further cause the processing device to:

select the amount of the computational resources to use for identifying the anomalies based at least on the magnitude of the anomalies to be identified.

* * * * *